US010947151B2

(12) United States Patent
Zielinska et al.

(10) Patent No.: US 10,947,151 B2
(45) Date of Patent: Mar. 16, 2021

(54) STONE-GLASS MACROCOMPOSITES AND COMPOSITIONS AND METHODS OF MAKING

(71) Applicant: UPTERIOR, LLC, New York, NY (US)

(72) Inventors: Agnieszka Zielinska, New York, NY (US); Anna Zielinska, New York, NY (US); Marian Klisch, Krosno (PL)

(73) Assignee: Upterior, LLC, New York, NY (US)

(*) Notice: Subject to any disclaimer, the term of this patent is extended or adjusted under 35 U.S.C. 154(b) by 48 days.

(21) Appl. No.: 16/094,750

(22) PCT Filed: Apr. 20, 2017

(86) PCT No.: PCT/US2017/028681
§ 371 (c)(1),
(2) Date: Oct. 18, 2018

(87) PCT Pub. No.: WO2017/184891
PCT Pub. Date: Oct. 26, 2017

(65) Prior Publication Data
US 2019/0127268 A1 May 2, 2019

Related U.S. Application Data

(60) Provisional application No. 62/325,137, filed on Apr. 20, 2016.

(51) Int. Cl.
*C03C 3/21* (2006.01)
*C03C 14/00* (2006.01)
*C03B 25/02* (2006.01)

(52) U.S. Cl.
CPC .............. *C03C 14/004* (2013.01); *C03C 3/21* (2013.01); *C03C 14/00* (2013.01); *C03B 25/02* (2013.01);
(Continued)

(58) Field of Classification Search
CPC ......... C03C 14/004; C03C 14/00; C03C 3/21; C03C 2214/08; C03C 2214/30; C03C 2214/34; C03C 2214/04; C03B 25/02
See application file for complete search history.

(56) References Cited

U.S. PATENT DOCUMENTS

| 2,422,628 A | 6/1947 | Mccarthy |
| 2,743,553 A | 5/1956 | Arrrtistead |

(Continued)

FOREIGN PATENT DOCUMENTS

| EP | 0866041 A2 | 9/1998 |
| EP | 2664589 A1 | 11/2013 |

(Continued)

OTHER PUBLICATIONS

U.S. Appl. No. 16/094,753, filed Oct. 18, 2018, Upterior, LLC.
(Continued)

*Primary Examiner* — Noah S Wiese
(74) *Attorney, Agent, or Firm* — Mueting Raasch Group

(57) ABSTRACT

A method of forming a macrocomposite including dispersing or immersing a first material in a second material. The first material includes a stone and the second material a glass; or the first material may be glass and the second material stone. The macrcocomposite may further include metal. Preferably, the macrocomposite does not include an organic resin, an adhesive, or a polymer.

24 Claims, 5 Drawing Sheets

(52) U.S. Cl.
CPC ...... C03C 2214/04 (2013.01); C03C 2214/08 (2013.01); C03C 2214/30 (2013.01); C03C 2214/34 (2013.01)

(56) References Cited

U.S. PATENT DOCUMENTS

| | | | |
|---|---|---|---|
| 3,338,692 A | 8/1967 | Hessigner et al. | |
| 3,407,091 A | 10/1968 | Busdiecker | |
| 3,443,914 A | 5/1969 | Hayashi | |
| 3,689,293 A | 9/1972 | Beall | |
| 3,793,824 A | 2/1974 | Simon-Vermot et al. | |
| 3,801,295 A | 4/1974 | Beall et al. | |
| 3,839,055 A | 10/1974 | Grossman | |
| 4,087,511 A * | 5/1978 | Ropp | C03C 3/00 423/277 |
| 4,109,054 A | 8/1978 | Burgyan | |
| 4,940,677 A | 7/1990 | Beall et al. | |
| 5,024,883 A | 6/1991 | Singhdeo et al. | |
| 5,043,222 A | 8/1991 | Cherukuri | |
| 5,328,874 A | 7/1994 | Beall et al. | |
| 5,840,638 A * | 11/1998 | Cao | C03C 1/002 501/48 |
| 6,060,011 A * | 5/2000 | Zandvliet | B44C 5/005 264/271.1 |
| 6,071,603 A * | 6/2000 | Sakai | C04B 35/80 428/304.4 |
| 6,592,706 B1 * | 7/2003 | Malherbe de Juvigny | B44C 5/005 156/292 |
| 6,601,409 B1 * | 8/2003 | Zandvliet | C03B 17/025 65/48 |
| 6,667,258 B2 | 12/2003 | Quinn | |
| 2006/0019044 A1 | 1/2006 | Watanabe | |
| 2013/0032556 A1 * | 2/2013 | Hiller | A47F 7/02 211/85.2 |
| 2014/0004168 A1 * | 1/2014 | Petit | A01N 25/26 424/417 |
| 2014/0197248 A1 * | 7/2014 | Govers | B05B 15/00 239/289 |
| 2014/0228197 A1 * | 8/2014 | Oogaki | C03C 3/16 501/46 |
| 2015/0210584 A1 * | 7/2015 | Zandvliet | C03B 19/1035 65/48 |
| 2016/0365541 A1 * | 12/2016 | Wehlus | C03C 14/004 |

FOREIGN PATENT DOCUMENTS

| | | | |
|---|---|---|---|
| EP | 3445729 A1 | 2/2019 | |
| EP | 3445730 A1 | 2/2019 | |
| GB | 894 328 A | 4/1962 | |
| GB | 2 397 581 A | 7/2004 | |
| JP | H09-255362 A | 9/1997 | |
| JP | H10-259070 A | 9/1998 | |
| WO | WO2006128208 A1 * | 7/2006 | A44C 17/04 |
| WO | WO 2006/128208 A1 | 12/2006 | |
| WO | WO 2014/166082 A1 | 10/2014 | |
| WO | WO 2017/184891 A1 | 10/2017 | |
| WO | WO 2017/184897 A1 | 10/2017 | |

OTHER PUBLICATIONS

ASTM C336-71 (2015), Standard Test Method for Annealing Point and Strain Point of Glass by Fiber Elongation.
Boccaccini et al., "Borosilicate glass matrix composites reinforced with short metal fibres," 1994, *Glass Science and Technology*, 67(1):16-20.
Borgna, "Artist Q&A: Albert Paley mixes metal, glass," The Leader, Mar. 27, 2016, available online http://www.the-leader.com/news/20160327/artist-qa-albert-paley-mixes-metal-glass [retrieved from the internet Oct. 23, 2018].
Brow, "PbO-free glasses for low temperature packaging" Sandia Report SAND-97-2391, Published Oct. 1, 1997. 44 pages.
Daniel, State-of-the-Art Report on Fiber Reinforced Concrete, ACI 544.IR-96 (Reapproved 2002). 66 pages.
Gonella, "Metal nanocluster composite silicate glasses," 2007, *Rev. Adv. Mater. Sci.*, 14:134-143.
Hynd, "Flat Glass Manufacturing Process" (Chapter 2) in *Glass: Science and Technology*, vol. 2. Uhlmann et al. (Eds.) Academic Press: New York, NY; 1984, Cover page, publisher's page, table of contents, pp. 45-106.
Karabulut et al., "Mechanical and structural properties of phosphate glasses," 2001, *Journal of Non-Crystalline Solids*, 288:8-17.
Kim et al., "Iron Phosphate Glass as an Alternative Waste-Form for Hanford LAW" 2003, Pacific Northwest National Laboratory PNNL14251. 60 pages.
Koudelka et al., "Structure and properties of titanium-zinc borophosphate glasses," 2005, *Journal of Solid State Chemistry*, 178:1837-43.
Lim et al., "Properties and structures of tin borophosphate glasses," 2010, *Journal of Non-Crystalline Solids*, 356:1379-84.
Loehman et al., "Development of High Performance Seals for Solid Oxide Fuel Cells," SECA Core Technology Program Review. Albuqerque, NM Sep. 30-Oct. 1, 2003. [retrieved from the internet Oct. 23, 2018].
Loehman et al., "Engineered Glass Composites for Sealing Solid Oxide Fuel Cells," SECA Core Technology Program Review. Boston, MA, May 11-13, 2004. [retrieved from the internet Oct. 23, 2018].
Loehman et al., "Engineered Glass Composites for Sealing Solid Oxide Fuel Cells," SECA Core Technology Program Review. Lakewood, CO, Oct. 25-26, 2005. [retrieved from the internet Oct. 23, 2018].
Sathishkumar et al., "Glass fiber-reinforced polymer composites—A review" 2014, *Journal of Reinforced Plastics and Composites* 33(13):1258-1275.
Scholes, "The Principles of Glassworking" (Chapter 14) in *Modern Glass Practice*. (Ed.) Van Nostrand Reinhold: New York NY; 1975. Cover page, publisher's page, table of contents, index, and pp. 225-237.
Seward III et al., "Inorganic Glasses: Commercial Glass Families, Applications, and Manufacturing Methods" (Chapter 6) in *Handbook of Ceramics, Glasses, and Diamonds*. Harper (Ed.) McGraw-Hill Professional: New York, NY 2001; 2001 (entire text of book provided).
Shi, "Properties of alkaline-resistant calcium-iron-phosphate glasses," Fall 2007 Masters Theses: Student Research & Creative Works, Missouri University of Science and Technology, pp. 1-67.
Smith, "The structure and properties of ternary zinc phosphate glasses for optical applications," Spring 2014, Doctoral Dissertations: Student Research & Creative Works, Missouri University of Science and Technology, pp. 1-197.
Tiwari et al., "Preparation and Characterization of Phosphate Glasses Containing Titanium," 2007, *BARC Newsletter (Founder's Day Special Issue)*, (285):167-73.
Walker, *Contemporary Fused Glass*, Four Corners International; 2010. Cover page, title page and table of contents, and index.
Wen et al., "Chemical Resistance of Non-Lead Phosphate Sealing Glass," 2006, *Amer. Cer. Soc. Bulletin* 85(7):9201-9204, 7 pgs.
International Patent Application No. PCT/US2017/028681, filed. Apr. 20, 2017; International Search Report and Written Opinion dated Oct. 12, 2017; 15 pages.
International Patent Application No. PCT/US2017/028681, filed Apr. 20, 2017; International Preliminary Report on Patentability dated Nov. 1, 2018; 9 pages.
International Patent Application No. PCT/US2017/028688, filed Apr. 20, 2017; International Search Report and Written Opinion dated Jul. 28, 2017; 14 pages.
International Patent Application No. PCT/US2017/028688, filed Apr. 20, 2017; International Preliminary Report on Patentability dated Nov. 1, 2018; 8 pages.
"Art Fusion" website [retrieved on Oct. 30, 2020]. Retrieved from the Internet: <https://www.artfusion.ch/Contact-presses=; 3 pgs.
Li-Tian et al., "Lead-Rich Glass Substance in Filled Treated Rubies," 2005, *Journal of Gems and Gemmology*, 7(2):1-6. (Abstract Only).
Liu et al., "Low melting $PbO-ZnO-P_2O_5$ glasses," 1996, *Physics and Chemistry of Glasses*, 37(6):227-235. (Abstract only).

(56) References Cited

OTHER PUBLICATIONS

McClure et al., "Identification and Durability of Lead Glass-filled Rubies," Spring 2006, *Gems & Gemology*, 41(1):22-34.
Segawa et al., "Properties and structures of $TiO_2$—$ZnO$—$P_2O_5$ glasses", 2010, *Journal of the Ceramic Society of Japan*, 118(4):278-282.
Zhang et al., "Glass matrix composite material prepared with waste foundry sand", Nov. 2006, *China Foundry*, 3(4):279-283.

* cited by examiner

STONE-GLASS MACROCOMPOSITES AND COMPOSITIONS AND METHODS OF MAKING

CONTINUING APPLICATION DATA

This application is the § 371 U.S. National Stage of International Application No. PCT/US2017/028681, filed Apr. 20, 2017, which claims the benefit of U.S. Provisional Application No. 62/325,137, filed Apr. 20, 2016, the disclosures of each of which are incorporated by reference herein in their entireties.

BACKGROUND

The combination of glass and stone is considered attractive by many artists, designers and architects. Because of the mismatch of thermal and mechanical properties between common, commercially available silicate glass and stone, however, an organic resin or polymer is often used to bind the materials in stone-glass composites. Furthermore, due to the complicated thermal characteristics unique to each stone type, and the differences that may be found between stone specimens, the existing solution is to use an organic resin or polymer to bind the materials. Such a resin or polymer limits both the thickness of the composite and location of the stone within the composite. In addition, the organic resin or polymer may alter the optical appearance of the macrocomposite, and in particular, the color and light reflection or refraction of the macrocomposite. Moreover, polymers, as substances of far lower hardness, chemical, and thermal durability than glass, make glass-stone composites more prone to scratches and undesired reactions with liquids or heat, which could spoil transparency or surface integrity of composites in which the polymer is on the surface.

SUMMARY

This disclosure describes a macrocomposite including glass and stone and methods of forming a macrocomposite including glass and stone. In some embodiments, the stone-glass macrocomposites does not include an organic resin, an adhesive, or a polymer.

In some embodiments, the stone is dispersed or immersed, fully or partially, in the glass. In some embodiments, the stone is uniformly dispersed in glass; in some embodiments, stone is non-uniformly dispersed in glass.

In some embodiments, glass is dispersed or immersed, fully or partially, in stone. In some embodiments, glass is uniformly dispersed in stone; in some embodiments, glass is non-uniformly dispersed in stone.

In one aspect, this disclosure describes a method of forming a macrocomposite including dispersing or immersing a stone in a glass. The stone has a volume of greater than 0.1 cubic millimeter ($mm^3$), greater than 1 $mm^3$, greater than 10 $mm^3$, greater than 100 $mm^3$, greater than 1000 $mm^3$, or greater than 10000 $mm^3$, and the macrocomposite does not include an organic resin, an adhesive, or a polymer.

In another aspect this disclosure describes a method of forming a macrocomposite including dispersing or immersing a glass in a stone. The glass has a volume of greater than 0.1 $mm^3$, greater than 1 $mm^3$, greater than 10 $mm^3$, greater than 100 $mm^3$, greater than 1000 $mm^3$, or greater than 10000 $mm^3$, and the macrocomposite does not comprise an organic resin, an adhesive, or a polymer.

In a further aspect this disclosure describes a composition comprising a stone and a glass wherein the stone is dispersed or immersed in the glass. The glass includes ZnO and $P_2O_5$, and the stone has a volume of greater than 0.1 $mm^3$, greater than 1 $mm^3$, greater than 10 $mm^3$, greater than 100 $mm^3$, greater than 1000 $mm^3$, or greater than 10000 $mm^3$.

In an additional aspect, this disclosure describes a macrocomposite prepared by a method that includes dispersing or immersing a stone in a glass, and annealing the glass after the stone is dispersed or immersed in the glass. The stone has a volume of greater than 0.1 $mm^3$, greater than 1 $mm^3$, greater than 10 $mm^3$, greater than 100 $mm^3$, greater than 1000 $mm^3$, or greater than 10000 $mm^3$, and the macrocomposite does not include an organic resin, an adhesive, or a polymer.

As used herein, "stone" (also referred to herein as "rock") refers to a solid single crystal, a solid aggregate of crystals, an agglomerate of crystals, a solid aggregate of one or more minerals or mineraloids, or an agglomerate of one or more minerals or mineraloids. Stone may be naturally occurring or synthetic. Stone may include an igneous rock, a sedimentary rock, a metamorphic rock, petrified wood, a fossil, a meteorite, a gemstone, precious stone, and/or semi-precious stone.

As used herein, "coefficient of thermal expansion" (also referred to herein as "thermal expansion coefficient") refers to a linear expansion coefficient. In some embodiments, the coefficient of thermal expansion for glass may be calculated at room temperature. In some embodiments, the coefficient of thermal expansion for glass is preferably calculated from a dilatometric curve. In some embodiments, the coefficient of thermal expansion for glass may be calculated using a temperature range that includes the temperatures at the macrocomposite is intended to be exhibited or stored (for example, a temperature range of 10 degrees Celsius (° C.) to 40° C. (283.15 Kelvin (K) to 313.15K). In some embodiments, the coefficient of thermal expansion for glass may be calculated using a temperature range from room temperature to a temperature 100° C. (373.15K) below the glass transition temperature ($T_g$). In some embodiments, the coefficient of thermal expansion for glass may be calculated at temperatures in a range from room temperature to the $T_g$ to the glass transition temperature ($T_g$). In some embodiments, the coefficient of thermal expansion for stone is preferably calculated at room temperature. In some embodiments, the coefficient of thermal expansion for stone is preferably calculated from a dilatometric curve. In some embodiments, the coefficient of thermal expansion for stone may be calculated using a temperature range that includes the temperatures at the macrocomposite is intended to be exhibited or stored (for example, a temperature range of 10° C. to 40° C. (283.15 Kelvin (K) to 313.15K). In some embodiments, the coefficient of thermal expansion for stone may be calculated using a temperature range of room temperature to 300° C. (573.15K). In some embodiments, the coefficient of thermal expansion for stone may be calculated using a temperature range from room temperature to the $T_g$ of the glass present in the metal-glass macrocomposite to room temperature.

As used herein, "macrocomposite" refers to a combination of two different materials wherein a first material is dispersed or immersed, fully or partially, in a second material, and wherein the first material has a volume that may be seen by an unaided human eye. In some embodiments, the first material has a volume of greater than 0.1 $mm^3$, greater than 1 $mm^3$, greater than 10 $mm^3$, greater than 100 $mm^3$, greater than 1000 $mm^3$, or greater than 10000 $mm^3$. In some embodiments, the first material includes multiple pieces having a volume of greater than 0.1 $mm^3$, greater than 1 mm³, greater than 10 mm³, greater than 100 mm³, greater than 1000 mm³, or greater than 10000 mm³.

As used herein, the viscosity values used are dynamic viscosity values.

As used herein, the glass transition temperature (also referred to herein as $T_g$) is the temperature at which the viscosity of a glass is $10^{13}$ decipascal-seconds (dPa·s).

As used herein "Littleton softening point" (also referred to herein as $T_{Lit}$) is the temperature at which the viscosity of a glass is $10^{7.65}$ dPa·s.

As used herein, "room temperature" is in a range of 16° C. to 26° C. or, more preferably, in a range of 18° C. to 24° C. In some embodiments, "room temperature" is 20° C.

The terms "coupled" or "fixed" refer to elements of the macrocomposite being attached to each other directly (in direct contact with each other).

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

Also herein, the recitations of numerical ranges by endpoints include all numbers subsumed within that range (for example, 1 to 5 includes 1, 1.5, 2, 2.75, 3, 3.80, 4, 5, etc.).

For any method disclosed herein that includes discrete steps, the steps may be conducted in any feasible order. And, as appropriate, any combination of two or more steps may be conducted simultaneously. As appropriate, steps may be omitted.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

The above summary of the present invention is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

Figure 1:
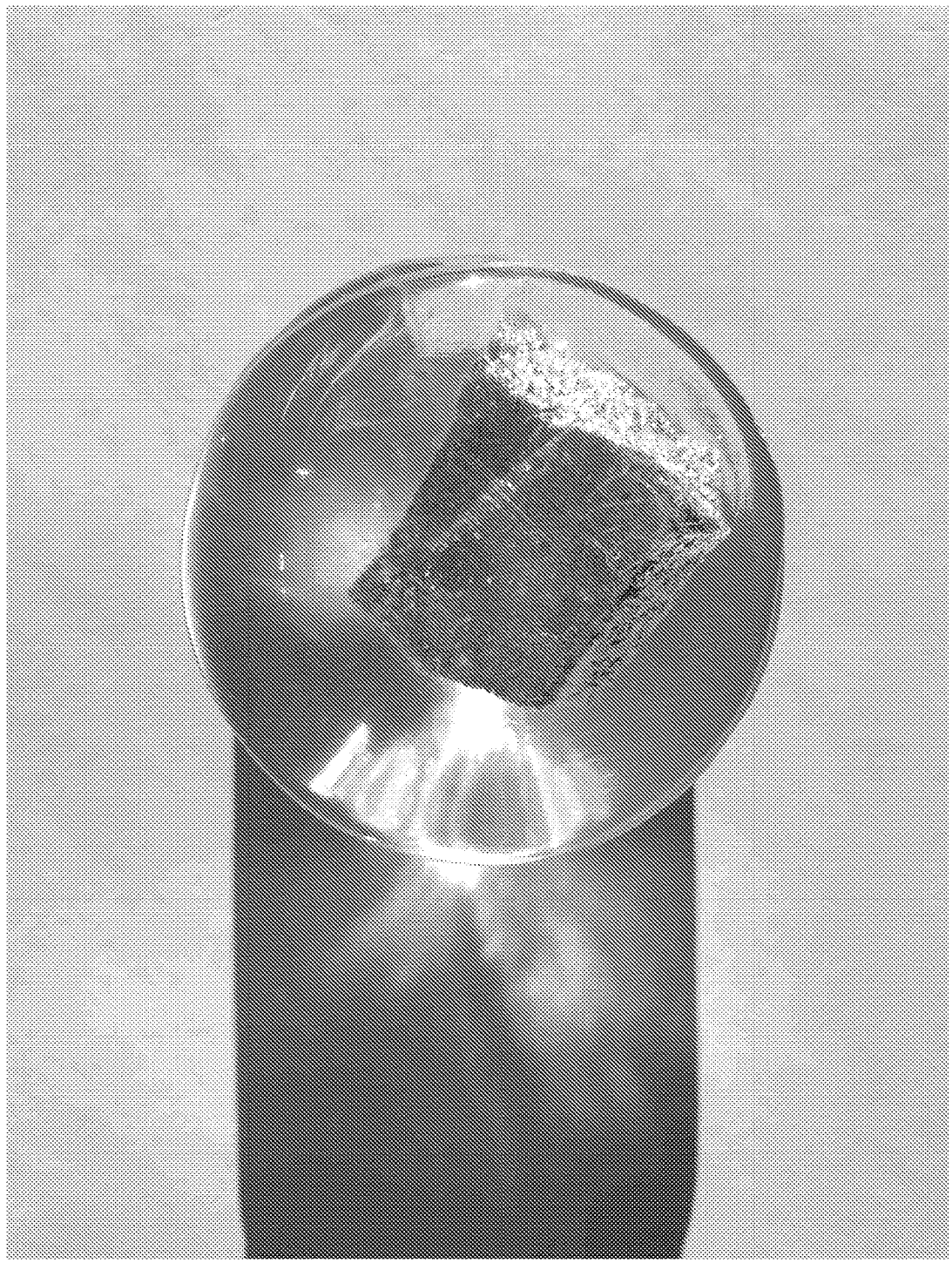
FIG. 1 shows a top view of an irregular sandstone chunk, fully immersed and suspended in a cast glass cylinder; made as described in Example 1.

This disclosure describes a macrocomposite including glass and stone and methods of forming a macrocomposite including glass and stone. In some embodiments, the macrocomposite does not include an organic resin, an adhesive, or a polymer. In some embodiments, the macorcomposite may further include metal.

In some embodiments, the stone is dispersed or immersed, fully or partially, in the glass. In some embodiments, the stone is uniformly dispersed in glass; in some embodiments, stone is non-uniformly dispersed in glass. In some embodiments, glass is dispersed or immersed, fully or partially, in stone. In some embodiments, glass is uniformly dispersed in stone; in some embodiments, glass is non-uniformly dispersed in stone.

In some embodiments, at least one of the stone or the glass has a volume that may be seen by an unaided human eye. In some embodiments, both the stone and the glass preferably have a volume that may be seen by an unaided human eye. In some embodiments, the stone is preferably visible. For example, the stone may be clearly visible to the human eye through the glass.

In some embodiments, the stone and the glass may be bound by chemical bonds. In some embodiments, the stone and the glass may be coupled. In some embodiments, the stone may be physically encased in a space defined by the glass. In some embodiments when the stone is encased in glass, the stone and the glass may be separated including for example, by a gas or by air. In some embodiments, at least a portion of the surface of the stone may be in intimate contact with the glass and/or fixed to the glass. In some embodiments, the entire surface of the stone may be in intimate contact with the glass and/or fixed to the glass.

Although, in some embodiments, a composition including the macrocomposite may further include an organic resin, an adhesive, or a polymer, the macrocomposite preferably does not include an organic resin, an adhesive, or a polymer. For example, an organic resin, an adhesive, or a polymer could be added to a macrocomposite for a protective effect or a design effect. In preferred embodiments, however, the macrocomposite itself does not include an organic resin, an adhesive, or a polymer; and an organic resin, an adhesive, or a polymer is not used to bind the stone and the glass and is not found at the stone-glass interface.

The macrocomposites described herein may be used in any suitable fashion. In some embodiments, the macrocomposites may be used in one or more of the following interior furnishings; exterior furnishings; a decorative and/or architectural component including, for example, furniture, lighting, a lamp, a partition wall or a screen, a tile, a vase, a container, a reflective surface, an art object, a glass pane, and a three dimensional rigid structure.

Properties of the Glass

Any suitable glass may be used for the macrocomposites described herein. In some embodiments, the glass and stone have matched coefficients of thermal expansion. In some embodiments, the difference in the coefficients of thermal expansion between the stone and the glass may be less than $35\times10^{-7}$ reciprocal kelvin ($K^{-1}$), less than $30\times10^{-7}$ $K^{-1}$, less than $25\times10^{-7}K^{-1}$, less than $20\times10^{-7}$ $K^{-1}$, or less than $10\times10^{-7}$ $K^{-1}$. The extent of the difference in the coefficients of thermal expansion may be selected based on the desire to prevent cracks or microcracks in the macrocomposite. As the difference in the coefficients of thermal expansion between the glass and the stone is increased, the likelihood of cracks or microcracks in the macrocomposite may increase.

In certain embodiments, the thermal expansion coefficient of the glass must be at least $30\times10^{-7}$ $K^{-1}$, at least $40\times10^{-7}$ $K^{-1}$, at least $50\times10^{-7}$ $K^{-1}$, at least $60\times10^{-7}$ $K^{-1}$, at least $70\times10^{-7}$ $K^{-1}$, at least $80\times10^{-7}$ $K^{-1}$, at least $90\times10^{-7}$ $K^{-1}$, at least $100\times10^{-7}$ $K^{-1}$, at least $110\times10^{-7}$ $K^{-1}$, at least $120\times10^{-7}$ $K^{-1}$, or at least $130\times10^{-7}$ $K^{-1}$.

In some embodiments, the thermal expansion coefficient of the glass may be chosen based on the thermal expansion coefficient of the stone.

In some embodiments, when the glass has a coefficient of thermal expansion greater than $60\times10^{-7}$ $K^{-1}$, the accepted difference in the coefficient of thermal expansion between stone and glass may be small, such as 5 percent (%) to 10%. In some embodiments, including when the glass has a low coefficient of thermal expansion, up to $60\times10^{-7}$ $K^{-1}$, the accepted difference in the coefficient of thermal expansion between stone and glass may be greater, such as 10% to 15%.

In some embodiments, including, for example, when the stone includes sandstone, which may have a thermal expansion coefficient in a range of $90\times10^{-7}$ $K^{-1}$ to $130\times10^{-7}$ $K^{-1}$, the glass may have a thermal expansion coefficient of at least $75\times10^{-7}$ $K^{-1}$, at least $80\times10^{-7}$ $K^{-1}$, at least $85\times10^{-7}$ $K^{-1}$, at least $90\times10^{-7}$ $K^{-1}$, at least $95\times10^{-7}$ $K^{-1}$, or at least $100\times10^{-7}$ $K^{-1}$, and/or up to $120\times10^{-7}$ $K^{-1}$, up to $125\times10^{-7}$ $K^{-1}$, up to $130\times10^{-7}$ $K^{-1}$, up to $135\times10^{-7}$ $K^{-1}$, up to $140\times10^{-7}$ $K^{-1}$, or up to $145\times10^{-7}$ $K^{-1}$ In some embodiments, the glass may have a thermal expansion coefficient in a range of $85\times10^{-7}$ $K^{-1}$ to $135\times10^{-7}$ $K^{-1}$.

In some embodiments, including, for example, when the stone includes basalt, which may have a thermal expansion coefficient in a range of $35\times10^{-7}$ $K^{-1}$ to $70\times10^{-7}$ $K^{-1}$, the glass may have a thermal expansion coefficient of at least $20\times10^{-7}$ $K^{-1}$, at least $25\times10^{-7}$ $K^{-1}$, at least $30\times10^{-7}$ $K^{-1}$, at least $35\times10^{-7}$ $K^{-1}$, at least $40\times10^{-7}$ $K^{-1}$, at least $45\times10^{-7}$ $K^{-1}$, at least $50\times10^{-7}$ $K^{-1}$, or at least $55\times10^{-7}$ $K^{-1}$, and/or up to $65\times10^{-7}$ $K^{-1}$, up to $70\times10^{-7}$ $K^{-1}$, up to $75\times10^{-7}$ $K^{-1}$, up to $80\times10^{-7}$ $K^{-1}$, up to $85\times10^{-7}$ $K^{-1}$, or up to $90\times10^{-7}$ $K^{-1}$. In some embodiments, the glass may have a thermal expansion coefficient in a range of $30\times10^{-7}$ $K^{-1}$ to $75\times10^{-7}$ $K^{-1}$.

In some embodiments, including, for example, when the stone includes petrified wood, which may have a thermal expansion coefficient in a range of $90\times10^{-7}$ $K^{-1}$ to $130\times10^{-7}$ $K^{-1}$, the glass may have a thermal expansion coefficient of at least $70\times10^{-7}$ $K^{-1}$, at least $75\times10^{-7}$ $K^{-1}$, at least $80\times10^{-7}$ $K^{-1}$, at least $85\times10^{-7}$ $K^{-1}$, at least $90\times10^{-7}$ $K^{-1}$, at least $95\times10^{-7}$ $K^{-1}$, at least $100\times10^{-7}$ $K^{-1}$, or at least $105\times10^{-7}$ $K^{-1}$, and/or up to $120\times10^{-7}$ $K^{-1}$, up to $125\times10^{-7}$ $K^{-1}$, up to $130\times10^{-7}$ $K^{-1}$, up to $135\times10^{-7}$ $K^{-1}$, up to $140\times10^{-7}$ $K^{-1}$, up to $145\times10^{-7}$ $K^{-1}$, or up to $150\times10^{-7}$ $K^{-1}$. In some embodiments, the glass may have a thermal expansion coefficient in a range of $85\times10^{-7}$ $K^{-1}$ to $135\times10^{-7}$ $K^{-1}$.

In some embodiments, including, for example, when the stone includes a trilobite, which may have a thermal expansion coefficient in a range of $90\times10^{-7}$ $K^{-1}$ to $130\times10^{-7}$ $K^{-1}$, the glass may have a thermal expansion coefficient of at least $70\times10^{-7}$ $K^{-1}$, at least $75\times10^{-7}$ $K^{-1}$, at least $80\times10^{-7}$ $K^{-1}$, at least $85\times10^{-7}$ $K^{-1}$, at least $90\times10^{-7}$ $K^{-1}$, at least $95\times10^{-7}$ $K^{-1}$, at least $100\times10^{-7}$ $K^{-1}$, or at least $105\times10^{-7}$ $K^{-1}$, at least $110\times10^{-7}$ $K^{-1}$, or at least $155\times10^{-7}$ $K^{-1}$, and/or up to $120\times10^{-7}$ $K^{-1}$, up to $125\times10^{-7}$ $K^{-1}$, up to $130\times10^{-7}$ $K^{-1}$, up to $135\times10^{-7}$ $K^{-1}$, up to $140\times10^{-7}$ $K^{-1}$, up to $145\times10^{-7}$ $K^{-1}$, or up to $150\times10^{-7}$ $K^{-1}$. In some embodiments, the glass may have a thermal expansion coefficient in a range of $85\times10^{-7}$ $K^{-1}$ to $135\times10^{-7}$ $K^{-1}$.

In some embodiments, including, for example, when the stone includes quartzite, which may have a thermal expansion coefficient in a range of $95\times10^{-7}$ $K^{-1}$ to $135\times10^{-7}$ $K^{-1}$, the glass may have a thermal expansion coefficient of at least $80\times10^{-7}$ $K^{-1}$, at least $85\times10^{-7}$ $K^{-1}$, at least $90\times10^{-7}K^{-1}$, at least $95\times10^{-7}$ $K^{-1}$, at least $100\times10^{-7}$ $K^{-1}$, at least $105\times10^{-7}$ $K^{-1}$, at least $110\times10^{-7}$ $K^{-1}$, or at least $115\times10^{-7}$ $K^{-1}$, and/or up to $130\times10^{-7}$ $K^{-1}$, up to $135\times10^{-7}$ $K^{-1}$, up to $140\times10^{-7}$ $K^{-1}$, up to $145\times10^{-7}$ $K^{-1}$, or up to $150\times10^{-7}$ $K^{-1}$. In some embodiments, the quartzite may include aventurine. Aventurine may have a thermal expansion coefficient in a range of $95\times10^{-7}$ $K^{-1}$ to $135\times10^{-7}$ $K^{-1}$ In some embodiments, the glass may have a thermal expansion coefficient in a range of $90\times10^{-7}$ $K^{-1}$ to $140\times10^{-7}$ $K^{-1}$.

In some embodiments, the macrocomposite may include glass and more than one stone. In such embodiments, the difference of thermal expansion coefficients between the stones in the macrocomposite is preferably small. For example, the difference in the thermal expansion coefficients between the first stone and the second stone may be up to $10\times10^{-7}$ $K^{-1}$, up to $15\times10^{-7}$ $K^{-1}$, up to $20\times10^{-7}$ $K^{-1}$, or up to $25\times10^{-7}$ $K^{-1}$. In such embodiments, the glass preferably has a thermal expansion coefficient in the range between the thermal expansion coefficient of the first stone and the thermal expansion coefficient of the second stone.

For example, in some embodiments, including when the stone includes sandstone (which has a thermal expansion coefficient in a range of $90\times10^{-7}$ $K^{-1}$ to $130\times10^{-7}$ $K^{-1}$) and a quartzite (which may have a thermal expansion coefficient of in a range of $95\times10^{-7}$ $K^{-1}$ to $135\times10^{-7}$ $K^{-1}$), the glass may have a thermal expansion coefficient of at least $85\times10^{-7}$ $K^{-1}$, at least $90\times10^{-7}$ $K^{-1}$, at least $95\times10^{-7}$ $K^{-1}$, at least $100\times10^{-7}$ $K^{-1}$, at least $105\times10^{-7}$ $K^{-1}$, at least $110\times10^{-7}$ $K^{-1}$, or at least $125\times10^{-7}$ $K^{-1}$, and/or up to $115\times10^{-7}$ $K^{-1}$, up to $120\times10^{-7}$ $K^{-1}$, up to $125\times10^{-7}$ $K^{-1}$, up to $130\times10^{-7}$ $K^{-1}$, up to $135\times10^{-7}$ $K^{-1}$, up to $140\times10^{-7}$ $K^{-1}$, or up to $145\times10^{-7}$ $K^{-1}$. In some embodiments, quartzite includes aventurine. In some embodiments, the glass may have a thermal expansion coefficient between the thermal expansion coefficient of sandstone and the thermal expansion coefficient of quartzite. In some embodiments, the glass may have a thermal expansion coefficient between the thermal expansion coefficient of sandstone and the thermal expansion coefficient of aventurine. In some embodiments, the glass may have a thermal expansion coefficient in a range of $95 \times 10^{-7}$ K$^{-1}$ to $130 \times 10^{-7}$ K$^{-1}$.

Among glasses possessing a suitable thermal expansion coefficient, glasses with a lower transition temperature may be, in some embodiments, preferable. That is, glass may be selected based on (1) thermal expansion coefficient and/or (2) glass transition temperature ($T_g$). In a preferred embodiment, a glass is selected such that the glass shifts into a low viscous state at a temperature less than the temperature where the integrity of the stone in the macrocomposite could be compromised. Because, as further discussed below, in some embodiments, during formation of the macrocomposite, the stone and glass are at the same temperature and the glass is at a temperature between the temperature of the melting point of the glass and the glass transition temperature ($T_g$) of the glass, it may be preferred to select a glass with a low $T_g$ and a low melting point to protect the integrity of the stone. In some embodiments the $T_g$ of selected glass will be up to 550° C., up to 500° C., up to 450° C., up to 400° C., up to 350° C., or up to 300° C. In some embodiments, the glass may have a melting temperature of up to 900° C., up to 950° C., up to 1000° C., up to 1150° C., or up to 1200° C.

Because stone is a solid at the moment of contact with glass, when stone is immersed in glass, its shrinkage (as an effect of cooling), may be compensated by glass flow into the area no longer occupied by the stone. The glass will continue to flow into any area created by stone shrinkage until the glass cools to the glass transition temperature (and the glass transforms to a solid). Thus, the dilatometric characteristics (including changes in the coefficient of thermal expansion as a function of temperature) of glass and stone from the $T_g$ of glass to room temperature may be important in selecting the components to be used in a glass-stone macrocomposite. In some embodiments, it is preferred that the difference in the coefficient of thermal expansion of the stone and the coefficient of thermal expansion of the glass is determined from $T_g$ of the glass to room temperature. In some embodiments, the difference in the coefficient of thermal expansion of the stone and the coefficient of thermal expansion of the glass may be determined at room temperature and/or at a working temperature range (that is, the temperature at which the macrocomposite is intended to be stored and/or exhibited).

In some embodiments, the components of the glass are varied to attain a coefficient of thermal expansion and a glass transition temperature that fulfill the above-described features. In some embodiments, the glass includes a phosphate glass including, for example, a zinc phosphate glass, a borophosphate glass, a sulfophosphate glass, an iron phosphate glass, etc. In some embodiments, phosphate glasses may exhibit a combination of desired properties including, for example, low glass transition temperatures, high expansion coefficients, and/or high refractive indices. In some embodiments, a high refractive index may be defined as a refractive index greater than the refractive index of common soda-lime glass (for example, a float glass), for which the index of refraction (Nd) is in the range of 1.51 to 1.52. In some embodiments, the glass includes a silicate glass including, for example, a lead silicate glass. In some embodiments, the glass does not include a silicate glass. In some embodiments, the glass includes zinc phosphate glass as a major component. In some embodiments, the glass includes borophosphate glass as a major component. In some embodiments, the glass includes iron phosphate glass as a major component. In some embodiments, the glass includes lead silicate glass as a major component. In some embodiments, the glass includes an aluminosilicate glass, a silicate-borate glass, a borosilicate glass, or boroaluminate glass. In some embodiments, the glass includes at least one of calcium, magnesium, barium, strontium, tin, bismuth, titanium, zirconium, erbium, neodymium, cerium, germanium, aluminum, sodium, potassium, and lithium.

In some embodiments, the glass preferably includes a phosphate glass. In some embodiments, the coefficient of thermal expansion for a phosphate glass may be preferably calculated using a temperature range from room temperature to 300° C. In some embodiments, the coefficient of thermal expansion for a phosphate glass may be at least $20 \times 10^{-7}$ K$^{-1}$, at least $25 \times 10^{-7}$ K$^{-1}$, at least $30 \times 10^{-7}$ K$^{-1}$, at least $35 \times 10^{-7}$ K$^{-1}$, at least $40 \times 10^{-7}$ K$^{-1}$, at least $45 \times 10^{-7}$ K$^{-1}$, at least $50 \times 10^{-7}$ K$^{-1}$, or at least $55 \times 10^{-7}$ K$^{-1}$, at least $60 \times 10^{-7}$ K$^{-1}$, or at least $65 \times 10^{-7}$ K$^{-1}$, at least $70 \times 10^{-7}$ K$^{-1}$, at least $75 \times 10^{-7}$ K$^{-1}$, at least $80 \times 10^{-7}$ K$^{-1}$, at least $85 \times 10^{-7}$ K$^{-1}$, at least $90 \times 10^{-7}$ K$^{-1}$, at least $95 \times 10^{-7}$ K$^{-1}$, at least $100 \times 10^{-7}$ K$^{-1}$, at least $105 \times 10^{-7}$ K$^{-1}$, at least $110 \times 10^{-7}$ K$^{-1}$, or at least $115 \times 10^{-7}$ K$^{-1}$. In some embodiments, the coefficient of thermal expansion for a phosphate glass may be up to $65 \times 10^{-7}$ K$^{-1}$, up to $70 \times 10^{-7}$ K$^{-1}$, up to $75 \times 10^{-7}$ K$^{-1}$, up to $80 \times 10^{-7}$ K$^{-1}$, up to $85 \times 10^{-7}$ K$^{-1}$, or up to $90 \times 10^{-7}$ K$^{-1}$, up to $95 \times 10^{-7}$ K$^{-1}$, up to $100 \times 10^{-7}$ K$^{-1}$, up to $105 \times 10^{-7}$ K$^{-1}$, up to $110 \times 10^{-7}$ K$^{-1}$, up to $115 \times 10^{-7}$ K$^{-1}$, up to $120 \times 10^{-7}$ K$^{-1}$, up to $125 \times 10^{-7}$ K$^{-1}$, up to $130 \times 10^{-7}$ K$^{-1}$, up to $135 \times 10^{-7}$ K$^{-1}$, up to $140 \times 10^{-7}$ K$^{-1}$, up to $145 \times 10^{-7}$ K$^{-1}$, or up to $150 \times 10^{-7}$ K$^{-1}$. For example, in some embodiments, the coefficient of thermal expansion for a phosphate glass may be in a range of $30 \times 10^{-7}$ K$^{-1}$ to $75 \times 10^{-7}$ K$^{-1}$, in a range of $85 \times 10^{-7}$ K$^{-1}$ to $135 \times 10^{-7}$ K$^{-1}$, or in a range of $90 \times 10^{-7}$ K$^{-1}$ to $140 \times 10^{-7}$ K$^{-1}$.

In some embodiments, the glass includes, expressed in mole percents, a range of 0% to 20% $Na_2O$, a range of 0% to 20% $K_2O$, a range of 0% to 20% $Li_2O$, a range of 29% to 34% $P_2O_5$, a range of 38% to 50% ZnO, a range of 0% to 5% of CaO, a range of 0% to 5% of MgO, a range of 0% to 5% of BaO, a range of 0% to 3% $Al_2O_3$, a range of 0% to 3% $Bi_2O_3$, a range of 0% to 2% $CeO_2$, a range of 0.1% to 3% $TiO_2$, and/or of 0% to 2% of $SnO_2$. In some embodiments, the glass further includes $Na_2O+K_2O+Li_2O$ in a range of 10% to 25%. In some embodiments, the glass further includes $CaO+MgO+BaO$ in a range of 0% to 8%. In some embodiments, the glass further includes $Al_2O_3+CeO_2+TiO_2+SiO_2$ in a range of 0.1% to 10%.

In some embodiments, the glass includes, expressed in mole percents, a range of 0% to 5% $Na_2O$, a range of 0% to 5% $K_2O$, a range of 0% to 5% $Li_2O$, a range of 38% to 42% $P_2O_5$, a range of 45% to 52% ZnO, a range of 0% to 2% $Al_2O_3$, a range of 0% to 3% $Bi_2O_3$, a range of 0% to 2% $CeO_2$, a range of 3% to 10% $TiO_2$, and/or a range of 0% to 2% of $SnO_2$. In some embodiments, the glass further includes $Na_2O+K_2O+Li_2O$ in a range of 1% to 6%. In some embodiments, the glass further includes $Al_2O_3+CeO_2+TiO_2+SiO_2$ in a range of 3% to 10%.

In some embodiments, a glass composition for use in a macrocomposite may be selected according to the following guidelines.

As further discussed above, the components of the glass composition may be selected and tuned to alter the coefficient of thermal expansion of the glass composition and/or the $T_g$ of the glass composition. In some embodiments, the coefficient of thermal expansion of the glass composition and/or the $T_g$ of the glass composition may be determined by dilatometric analysis.

In some embodiments, components of the glass composition may be selected to avoid components in the glass that could increase the tendency of the glass to crystallize as a result of a reaction with compounds in the stone.

In some embodiments, the glass composition includes a zinc phosphate glass including $ZnO:P_2O_5$ at a molar ratio of 2:1. In some embodiments, for example, the glass may include 66.6 mol % of ZnO and 33.4 mol % of $P_2O_5$. In some embodiments, a zinc phosphate glass having the indicated molar ratio exhibits a decreased tendency of crystallization for two component $xZnO(1-x)P_2O_5$ glasses. $Na_2O$, $K_2O$, $Li_2O$, CaO, MgO, and/or BaO may be substituted for ZnO on a molar basis and $Al_2O_3$, $TiO_2$, $CeO_2$, $ZrO_2$, $Bi_2O_3$, and/or $SnO_2$ may be substituted for $P_2O_5$ on a molar basis so long as the molar ratio of the sum of ($\Sigma$) (ZnO, CaO, MgO, BaO, $Na_2O$, $K_2O$, $Li_2O$): $\Sigma(P_2O_5, Al_2O_3, TiO_2, ZrO_2, CeO_2, Bi_2O_2, SnO_2)$ is maintained at 2:1.

In some embodiments, wherein the glass composition includes ZnO and $P_2O_5$, the combined mass percent (also referred to herein as weight percent) of ZnO and $P_2O_5$ is at least 60, at least 70, at least 75, or at least 80.

In some embodiments, the O/P atomic ratio of the glass composition may be in a range of 3.5 to 4.0. In some embodiments, the O/P atomic ratio should be kept closer to 3.5 when pyrophosphates are included. In some embodiments, the O/P atomic ratio should be kept closer to 4.0 when orthophosphates are included.

In some embodiments, mixed oxides may be used. For example, $Na_2O$ and $K_2O$ may be used in similar concentrations. Without wishing to be bound by theory, it is believed that using mixed oxide may prevent glass crystallization.

In some embodiments, $K_2O$ may be used instead of $Na_2O$ to increase the coefficient of thermal expansion of the glass composition.

In some embodiments, $TiO_2$ may be included in the glass composition to decrease the coefficient of thermal expansion of the glass composition.

In some embodiments, $Al_2O_3$ and/or $TiO_2$ may be included in the glass composition. Without wishing to be bound by theory, it is believed that $Al_2O_3$ and/or $TiO_2$ may increase chemical resistance of the glass composition (including, for example, to water and/or moisture).

In some embodiments, CaO, BaO, and/or MgO may be substituted for a portion of the ZnO in the glass composition. Without wishing to be bound by theory, it is believed that such a substitution may increase chemical resistance of the glass composition (including, for example, to water and/or moisture).

In some embodiments, the glass composition preferably does not include a carbonate. In some embodiments, the glass composition preferably does not include a sulfate. In some embodiments, the glass composition preferably does not include $(NH_4)_3PO_4$.

In some embodiments, clear glass (instead of glass with seeds or bubbles) is preferred. In embodiments where seeding and/or bubbling is not preferred, the glass may preferably not include dissolved gases including, for example, $CO_2$ or $SO_2$. Thus, in some embodiments, no carbonate or sulfate is included in the glass. In some embodiments, the glass is clear enough that the stone is visible.

In some embodiments, the glass composition may include the components and/or amounts shown in Table 1, Table 2, or Table 3.

In some embodiments, the glass composition may include the components and/or amounts shown in Table 1. In some embodiments, the glass composition may include the components and/or amounts shown in Table 1 when the macro-composite includes stone having a coefficient of thermal expansion in range of $90 \times 10^{-7}$ $K^{-1}$ to $180 \times 10^{-7}$ $K^{-1}$. Stone having a coefficient of thermal expansion in range of $90 \times 10^{-7}$ $K^{-1}$ to $180 \times 10^{-7}$ $K^{-1}$ may include, for example, sandstone, petrified wood, and/or slate.

TABLE 1

|  | mole percent |
| --- | --- |
| $Na_2O$ | 0-20 |
| $K_2O$ | 0-20 |
| $Li_2O$ | 0-20 |
| $Na_2O + K_2O + Li_2O$ | 10-25 |
| $P_2O_5$ | 29-34 |
| ZnO | 38-50 |
| CaO | 0-5 |
| MgO | 0-5 |
| BaO | 0-5 |
| CaO + MgO + BaO | 0-8 |
| $Al_2O_3$ | 0-3 |
| $Bi_2O_3$ | 0-3 |
| $CeO_2$ | 0-2 |
| $TiO_2$ | 0.1-3 |
| $SnO_2$ | 0-2 |
| $Al_2O_3 + CeO_2 + TiO_2 + SnO_2$ | 0.1-10 |

In some embodiments, the glass composition may include the components and/or amounts shown in Table 2. In some embodiments, the glass composition may include the components and/or amounts shown in Table 2 when the macro-composite includes stone having a coefficient of thermal expansion in range of $70 \times 10^{-7}$ $K^{-1}$ to $100 \times 10^{-7}$ $K^{-1}$.

TABLE 2

|  | mole percent |
| --- | --- |
| $Na_2O$ | 0-5 |
| $K_2O$ | 0-5 |
| $Li_2O$ | 0-5 |
| $Na_2O + K_2O + Li_2O$ | 1-6 |
| $P_2O_5$ | 38-42 |
| ZnO | 45-52 |
| $Al_2O_3$ | 0-2 |
| $Bi_2O_3$ | 0-3 |
| $CeO_2$ | 0-2 |
| $TiO_2$ | 3-10 |
| $SnO_2$ | 0-2 |
| $Al_2O_3 + CeO_2 + TiO_2 + SnO_2$ | 3-10 |

In some embodiments, the glass composition may include the components and/or amounts shown in Table 3. In some embodiments, the glass composition may include the components and/or amounts shown in Table 3 when the macro-composite includes stone having a coefficient of thermal expansion in range of $50 \times 10^{-7}$ $K^{-1}$ to $80 \times 10^{-7}$ $K^{-1}$. In some embodiments, the glass composition may be a dark glass (for example, a brown or black colored glass).

TABLE 3

|  | mole percent |
| --- | --- |
| ZnO | 10-15 |
| $P_2O_5$ | 50-62 |
| $Al_2O_3$ | 0-2 |
| $TiO_2$ | 0-5 |
| $Na_2O$ | 0-20 |
| $K_2O$ | 0-15 |
| CaO | 0-25 |
| $Fe_2O_3$ | 5-32 |

In some embodiments, compounds of elements which may exist in two or more oxidation states in glass are added, such as SnO, $SnO_2$, $CeO_2$, etc., to create an aesthetically desirable surface interaction on the stone. Stone surface modification may also be obtained as a result of the reaction of the stone. In some embodiments, zinc, tin, titanium, bismuth and/or aluminum may be added to the glass composition to obtain a surface interaction on the stone.

In some embodiments, the glass includes compounds to increase the refractive index of glass in the macrocomposite. A high refractive index may be considered a desirable property of glass in the macrocomposite. In some embodiments, a high refractive index may be defined as a refractive index greater than the refractive index of common soda-lime glass (for example, a float glass), for which the index of refraction (Nd) is in the range of 1.51 to 1.52. In some embodiments, bismuth oxide, titanium oxide, or lead oxides may be added to increase the refractive index. In some embodiments, bismuth oxide or titanium oxide are preferably added. In some embodiments, the glass may be enriched with neodymium, praseodymium, erbium, cerium, titanium, or a mixture thereof, to modify optical properties of glass in the macrocomposite, for example to obtain a dichroism effect.

In some embodiments, an element possessing an absorption band within the visible spectrum may be added to glass. Such an element may be added to, for example, modify the transmittance of light through the glass by selective absorption in some range of the spectrum. For example, the glass may include one or more oxides or other compounds of iron, copper, chromium, cobalt, nickel, cadmium, selenium, manganese, lanthanum, neodymium, praseodymium, erbium, vanadium, uranium, or mixtures thereof. The element possessing an absorption band within the visible spectrum may be selected by a skilled artisan depending on the desired coloring of the stone and glass within the macrocomposite.

In some embodiments, the glass may include some degree of opalescence. Such opalescence may be obtained, for example, by controlled crystallization or phase separation. For example, the glass may include fluoride, zirconium, a titanium oxide, a tin oxide, or a calcium oxide in an amount over the saturation solubility of the glass. Phase separation effect occurs as a result of the introduction of different glass former oxides, for example silicon dioxide or suitable silicate into phosphate glass, phosphorus pentoxide or suitable phosphate into silicate glass, boron trioxide or suitable borate into phosphate glass, or phosphorus pentoxide or suitable phosphate into borate glass.

In some embodiments, the glass has a matching coefficient of thermal expansion with the stone. A glass having a matching coefficient of thermal expansion with the stone in the macrocomposite may, in some embodiments, be a float glass. In some embodiments, a float glass has a thermal expansion coefficient of $80 \times 10^{-7}$ $K^{-1}$ to $95 \times 10^{-7}$ $K^{-1}$ In some embodiments, the glass composition may include a soda-lime-silicate glass (having a thermal expansion coefficient of $89 \times 10^{-7}$ $K^{-1}$ in a temperature range of 20° C. to 300° C., a $T_g$ in a range of 550° C. to 555° C., a $T_{Lit}$ in a range of 610° C. to 615° C.). In some embodiments, the glass composition includes a soda-lime-silicate glass and a stone having a thermal expansion coefficient in a range of $80 \times 10^{-7}$ $K^{-1}$ to $96 \times 10^{-7}$ $K^{-1}$ in a temperature range of 20° C. to 300° C. including, for example, certain kinds of sapphire, synthetic fluorine mica, and hematite.

In some embodiments, a stone-glass macrocomposite may be encased in one or more additional glasses. For example, a second glass, a third glass, a fourth glass, etc. may form an additional layer on a stone glass macrocomposite. In some embodiments, the layers of glass may have increasing or decreasing thermal expansion coefficients.

Properties of the Stone

The stone may include, for example, at least one of grit, gravel, a chunk, an irregular shape, or a regular geometric form. In some embodiments, the stone may include at least one of an igneous rock, a sedimentary rock, a metamorphic rock, petrified wood, a fossil, a gemstone, or a meteorite. A fossil may include, for example, a trilobite. In some embodiments, the stone may include at least one of sandstone, basalt, quartzite, gabbro, granite, gneiss, slate, and hematite. In some embodiments, the stone may be a gemstone. In some embodiments, the stone may be a precious stone or a semi-precious stone. In some embodiments, for example, the stone may be a sapphire or a ruby. In some embodiments, the stone is a natural stone; in some embodiments, the stone may be a synthetic stone. A synthetic stone may include, for example, synthetic fluorine mica. In some embodiments, the stone includes a mineral phase in the form of a single crystal, an aggregate of crystals, or an agglomerate of crystals. In some embodiments, the stone may be a naturally occurring single crystal, a solid aggregate of crystals, an agglomerate of crystals, a solid aggregate of one or more minerals or mineraloids, or an agglomerate of one or more minerals or mineraloids.

In some embodiments, the coefficient of thermal expansion of the stone and the glass must be matched. In some embodiments, however, and as further discussed herein, pretreatment of the stone may be used to overcome certain problems posed by a difference between the coefficient of thermal expansion of the stone and the glass or by the behavior of a stone in a hot glass melt.

In some embodiments, the stone may have a thermal expansion coefficient of at least $25 \times 10^{-7}$ $K^{-1}$, at least $30 \times 10^{-7}$ $K^{-1}$, at least $35 \times 10^{-7}$ $K^{-1}$, at $40 \times 10^{-7}$ $K^{-1}$, at least $45 \times 10^{-7}$ $K^{-1}$, at least $50 \times 10^{-7}$ $K^{-1}$, at least $55 \times 10^{-7}$ $K^{-1}$, at least $60 \times 10^{-7}$ $K^{-1}$, at least $65 \times 10^{-7}$ $K^{-1}$, at least $70 \times 10^{-7}$ $K^{-1}$, at least $75 \times 10^{-7}$ $K^{-1}$, at least $80 \times 10^{-7}$ $K^{-1}$, at least $85 \times 10^{-7}$ $K^{-1}$, at least $90 \times 10^{-7}$ $K^{-1}$, at least $95 \times 10^{-7}$ $K^{-1}$, or at least $100 \times 10^{-7}$ $K^{-1}$. In some embodiments, the stone may have a thermal expansion coefficient of up to $60 \times 10^{-7}$ $K^{-1}$, at least $65 \times 10^{-7}$ $K^{-1}$, at least $70 \times 10^{-7}$ $K^{-1}$, at $75 \times 10^{-7}$ $K^{-1}$, at least $80 \times 10^{-7}$ $K^{-1}$, at least $85 \times 10^{-7}$ $K^{-1}$, at least $90 \times 10^{-7}$ $K^{-1}$, at least $95 \times 10^{-7}$ $K^{-1}$, at least $100 \times 10^{-7}$ $K^{-1}$, at least $105 \times 10^{-7}$ $K^{-1}$, at least $110 \times 10^{-7}$ $K^{-1}$, at least $115 \times 10^{-7}$ $K^{-1}$, at least $120 \times 10^{-7}$ $K^{-1}$, at least $125 \times 10^{-7}$ $K^{-1}$, at least $130 \times 10^{-7}$ $K^{-1}$, at least $135 \times 10^{-7}$ $K^{-1}$, at least $140 \times 10^{-7}$ $K^{-1}$, at least $145 \times 10^{-7}$ $K^{-1}$, or at least $150 \times 10^{-7}$ $K^{-1}$.

For example, in some embodiments, the stone may have a thermal expansion coefficient in a range of $25 \times 10^{-7}$ $K^{-1}$ to $135 \times 10^{-7}$ $K^{-1}$. Examplary stones and thermal expansion coefficients may include the following. Sandstone may have a thermal expansion coefficient in a range of $90 \times 10^{-7}$ $K^{-1}$ to $130 \times 10^{-7}$ $K^{-1}$; basalt may have a thermal expansion coefficient in a range of $35 \times 10^{-7}$ $K^{-1}$ to $70 \times 10^{-7}$ $K^{-1}$; petrified wood may have a thermal expansion coefficient in a range of $90 \times 10^{-7}$ $K^{-1}$ to $130 \times 10^{-7}$ $K^{-1}$; quartzite may have a thermal expansion coefficient in a range of $95 \times 10^{-7}$ $K^{-1}$ to $135 \times 10^{-7}$ $K^{-1}$; a trilobite may have a thermal expansion coefficient in a range of $90 \times 10^{-7}$ $K^{-1}$ to $130 \times 10^{-7}$ $K^{-1}$; some kinds of gabbro and/or granite may have a thermal expansion coefficient in a range of $50 \times 10^{-7}$ $K^{-1}$ to $100 \times 10^{-7}$ $K^{-1}$.

When forming stone-glass macrocomposites, a variety of stone properties, which contribute to the thermal expansion characteristics or the behavior of a stone in a hot glass melt, may be considered. Stones of natural origin should generally not be considered chemical compounds of strictly defined composition and properties, but rather should be considered families of stone that share several of the same attributes, such as, for example, main mineral phases, porosity, granulation, microcracks, texture etc.

In some embodiments, selection of a stone-glass macrocomposite preparation method and/or glass composition may be customised on the basis of at least one of the following: mineral phase composition of the stone (determined, for example from X ray powder diffraction (XRD) analysis), the amount of water and/or gas in the stone (determined, for example, from Differential Thermal Analysis (DTA), Thermogravimetric Analysis (TGA), or Differential Scanning Calorimetry (DSC)), and the coefficient of thermal expansion of the stone (determined, for example, as function of temperature from dilatometric measurements). In some embodiments, defects observed during macrocomposite formation may additionally or alternatively provide information about the stone. For example, if bubbles are observed during macrocomposite formation, it may indicate that the stone is porous or contains chemically bound water and/or a hydrated salt. In some embodiments where bubbles are observed during macrocomposite formation, thermal pretreatment and/or DTA or DSC analysis may be indicated. If cracks are observed during macrocomposite formation, dilatometry analysis and/XRD analysis may be performed to determine if the stone includes mineral phases (for example, quartz, hydroxy-phlogopite, kaolinite, calcite, etc.) that may indicate certain temperatures to avoid (including, for example, particular temperature ranges or temperatures above a certain limit).

Each mineral that constitutes a stone may have a different thermal expansion coefficient, and the presence of anisotropic expansion characteristics in some minerals, which are dependent on the crystallographic axes of the present minerals, may contribute to localized differences in the thermal expansion characteristics within a stone. Such differences in coefficients of thermal expansion may cause stresses to accumulate at boundaries between different constituent minerals, and between individual single crystals of selected mineral when its thermal expansion coefficient exhibits anisotropy. In some embodiments, the problems caused by such differences may be overcome by heating the stone uniformly, as further described below; in contrast, failure to heat the stone uniformly may exacerbate such differences because different components are subjected to different temperatures.

In some embodiments, a stone to be used in a macrocomposite may be selected because it exhibits properties helpful for forming a successful macrocomposite.

For example, in some embodiments, a stone may be selected for combination with molten glass based on a minimal presence of water (including chemically bound water) and/or organic residues encapsulated in the closed stone structure. Without wishing to be bound by theory, water and/or organic residues encapsulated in the closed stone structure may be difficult to remove in a reasonable timeframe by thermal treatment. In some embodiments, certain types of sandstone, petrified wood, and slate do not contain water encapsulated in the stone structure or contain minimal amounts of water encapsulated in the stone structure. In certain embodiments, certain types of stone including, for example, some sandstone, petrified wood, and slate, contain organic deposits that may be removed by thermal treatment.

In some embodiments, a stone having a chemically bound water content in a concentration of up to 0.005 weight percent (wt. %), up to 0.01 wt. %, or up to 0.1 wt. % may be used. Although, chemically bound water may, in some stones such as topaz, amethyst, and natural micas (including, for example, hydroxyl phlogopite), cause cracking when stone and hot glass come into contact, thermal pretreatment of the stone, as further described herein, may facilitate the thermal decomposition of water-containing compounds and enable water evaporation from the stone prior to contact with hot glass during macrocomposite formation. In some embodiments, however, the stone may preferably be anhydrous.

In some embodiments, a stone may be selected according to porosity characteristics. In some embodiments, complicated pore systems with open, but narrow pores prevent fast replacement of air with glass, resulting in bubble generation during macrocomposite preparation. Consequently, a stone without pores may, in some embodiments, be preferred. In some embodiments, a stone with high porosity and/or with larger pores may be advantageous. In some embodiments, a stone having pores that may be easily filled with molten glass may be preferred. In some embodiments, including for example, when pores in stone might otherwise cause undesirable cracking and bubbling at the contact of stone and hot glass, thermal pretreatment of the stone, as further described herein, may be used to abrogate the formation of cracks and bubbles.

In some embodiments, stones having a quartz phase in large grain form (greater than approximately 1 millimeter (mm)) may be avoided. Such forms may be subject to non-uniform expansion or shrinkage and may, therefore, be problematic. In some embodiments, the stone may preferably have a fine-grain quartz structure (that is, quartz structures of less than 1 mm). Stones having such fine-grain quartz structure may include, for example, sandstone, a fossil, quartzite, or aventurine. In some embodiments, including, for example, to minimize stress in the macrocomposite, stone with fine crystals may be preferred.

In some embodiments, including, for example, to minimize stress in the macrocomposite, stone with isotropic thermal expansion may be preferred. Stone with isotropic thermal expansion exhibits a coefficient of expansion that is the same in each direction, compatible with the thermal expansion characteristic of glass. In some embodiments, single crystals of minerals of cubic symmetry may be selected because they exhibit isotropic thermal expansion. Such minerals may include, for example, pyrite, garnet, muscovite, etc.

In some embodiments, including, for example, to minimize stress in the macrocomposite, a stone having low levels of thermal expansion anisotropy, for example, in the range of 5% to 10%, may be preferred. A stone having low levels of anisotropy has minimal differences in thermal expansion coefficients between the axes.

In some embodiments, a stone having high structural homogeneity may be preferred. In some embodiments, a stone having high structural homogeneity may include a stone of having a homogenous distribution of mineral constituents, including, for example, fine crystals. In a stone having high structural homogeneity, the coefficient of thermal expansion is more uniform than in a nonhomogeneous stone, wherein different mineral phases have a different coefficient of thermal expansion. In some embodiments, a stone having high structural homogeneity may also include, for example, the absence of voids, the absence of pores filed with gases, the absence of cracks, and/or the absence of contamination. In some embodiments, however, a stone may preferably be nonhomogeneous, with phases that exhibit similar expansion characteristics.

Formation of the Macrocomposite

Any suitable formation technique may be used to form the macrocomposites described herein. For example, a macrocomposite and/or the glass in the macrocomposite may be formed by being blown, pressed, rolled, cast and/or fused. In some embodiments, the methods of forming the macrocomposite are high temperature methods, that is, methods that use temperatures within the range of glass manufacture and processing.

In a preferred embodiment, at the time of contact with the stone, glass used in a macrocomposite may be at a temperature between the temperature of the melting point of the glass and the glass transition temperature ($T_g$) of the glass. In some embodiments, the temperature difference between the glass and stone during macrocomposite formation (for example at the time of dispersing or immersing the first material in the second material) is preferably small. For example, the temperature difference between the glass and the stone during macrocomposite formation may be less than 300° C., less than 200° C., less than 100° C., less than 75° C., less than 50° C., less than 25° C., or less than 10° C. In some embodiments, the temperature of the glass and stone during macrocomposite formation may be equal. To decrease the temperature difference between the stone and the glass, the stone may, in some embodiments, be preheated.

In some embodiments, the stone may be preheated in a furnace to a temperature of at least 250° C., at least 300° C., or at least 350° C. and/or up to 500° C., up to 520° C., up to 540° C., up to 560° C., up to 580° C., up to 600° C., up to 700° C., up to 800° C., up to 850° C., or up to 900° C. In some embodiments, it is preferable to preheat the stone immediately before combining the stone and the glass, for example, completing the heating of the stone within 5 hours, within 2 hours, within 30 minutes or within 10 minutes of contacting the stone and the glass. In some embodiments, the stone may be preheated to a temperature greater than the temperature of the glass at the time of dispersing or immersing the stone in glass.

In some embodiments, the stone may be preheated to a temperature determined by a risky phase transition point (that is, a phase transition accompany by a size and/or volume change). For example, for sandstone, petrified wood, and slate, the stone may be preheated to a temperature lower than an $\alpha$-$\beta$ quartz transition (for example, 573° C.).

When the glass used in the macrocomposite is obtained by melting, after the melting process, the glass melt may be cooled down to the glass-stone binding temperature. In some embodiments, the glass-stone binding temperature is a temperature in a range between the $T_g$ of glass and the melting point of glass. If one or more components of the stone undergo polymorphic transformation with a corresponding volume change during thermal treatment, the glass-stone binding temperature may preferably be below the temperature of polymorphic transformation of the stone.

In some embodiments, the temperature of the stone at the time of contact with the glass is greater than the $T_g$ of the glass. If heated to the glass-stone binding temperature, the stone is heated with a heating rate appropriate to the stone thermal expansion characteristics. In some embodiments, the temperature of stone-glass macrocomposite preferably does not fall below the $T_g$ of the glass prior to annealing, Without wishing to be bound by theory, such a drop in temperature is believed to result in a thermal shock to the glass that may cause cracks or microcracks. Consequently, in some embodiments, the temperature of the stone must be such that its insertion into hot glass does not cause the glass within the macrocomposite to cool below the $T_g$ of the glass.

A shaping technique for the macrocomposite may be chosen based on the desired characteristic of the macrocomposite shape and/or surface appearance or finishing. For example, a glass surface of the macrocomposite may be formed by surface tension of liquid glass while casting or free blowing (without the use of molds). In some embodiments, including, for example, when the glass surface requires a special surface texture or pattern, rolling may be used, or pressing, blowing, casting, or fusing a mold. A combined or multistep process may be applied to obtain more complex results, such as for the creation of interlacing three-dimensional structures of glass and stone. In some embodiments, a sintering process of glass cullet may be used to obtain glass-stone macrocomposite shapes. As used herein, glass cullet refers to glass including, for example broken glass, that has already been melted and which may be melted or softened again during a sintering process.

In some embodiments, including, for example, when using a sintering process as a method of macrocomposite preparation, transparency instead of translucency is preferred in the final product. Without wishing to be bound by theory, opacity or translucency is believed to result from internal boundaries within the macrocomposite having different optical densities. In some embodiments, to avoid opacity or translucency, the sintering temperature may be selected outside the crystallization range of the glass. In some embodiments, to avoid opacity or translucency, cullet lumps measuring at least 3 mm, at least 4 mm, or at least 5 mm in diameter may be used as the macrocomposite precursor.

In some embodiments, a glass (including, for example, a crushed or powdered glass) may be heated during macrocomposite formation to a temperature between the Littleton softening point of the glass and the melting point of the glass, allowing the glass to take the shape of the mold. In some embodiments, frit, fiber, or strips of glass may be used instead of or in addition to crushed or powdered glass. Powder, frit, fiber, or strips of glass may also be used to fill natural or artificial voids inside the stone, or to combine separate stone elements into one rigid item.

In some embodiments, the temperature and viscosity of the glass at the time of contacting the glass and the stone preferably corresponds to a viscosity value adequate for a selected shaping technique. For example, the temperature of the glass at the time of contacting the glass with stone may correspond to viscosity values in a range of $10^2$ dPas to $10^8$ dPas for casting; the temperature of the glass at the time of contacting the glass with stone may correspond to viscosity values in a range of $10^3$ dPas to $10^5$ dPas for blowing; the temperature of the glass at the time of contacting the glass with stone corresponds to viscosity values in a range of $10^3$ to $10^8$ dPas for pressing or rolling. In some embodiments, for example, the viscosity of the glass may be at least $10^2$ dPas, at least $10^3$ dPas, or at least $10^4$ dPas. In some embodiments, the viscosity of the glass may be up to $10^3$ dPas, up to $10^4$ dPas, up to $10^5$ dPas, up to $10^6$ dPas, up to $10^7$ dPas, or up to $10^8$ dPas. In some embodiments, for example, when a stone is dispersed or immersed in glass and the glass is pressed or rolled, the temperature of the glass at the time of contacting the glass with stone corresponds to a viscosity in a range of $10^3$ to $10^8$ dPas.

In some embodiments, including for the stone-in-glass macrocomposites further discussed below, the method of forming the macrocomposite includes heating the glass prior to dispersing or immersing the stone in the glass. Heating the glass may result in the glass achieving a viscosity up to $10^3$ dPas, up to $10^4$ dPas, or up to $10^5$ dPas. In such embodiments, the viscosity of the glass during pressing or rolling may be $10^3$ dPas, $10^4$ dPas, or $10^5$ dPas.

In some embodiments, for example, to hold or to re-establish the temperature needed for the shaping of the glass, the glass may be preheated in a furnace. In some embodiments, for example, the glass may be heated prior to contacting the stone. In some embodiments, the glass may be preheated in an auxiliary furnace. In some embodiments, the glass may be preheated in a glazed porcelain crucible.

In some embodiments, the temperature of the glass prior to contact with the stone is sufficient to obtain a glass viscosity of up to $10^3$ dPas, up to $10^4$ dPas, up to $10^5$ dPas, or up to $10^6$ dPas upon contact. For example, the glass may be heated prior to contacting the stone to a temperature sufficient to obtain a glass viscosity up to $10^3$ dPas, when a viscosity of $10^3$ dPas is used during pressing or rolling. For example, the glass may be heated prior to contacting the stone sufficient to obtain a glass viscosity up to $10^5$ dPas, when a viscosity of $10^5$ dPas is used during pressing or rolling.

In some embodiments, the glass and stone may be combined together using a fusing process. In some embodiments, the fusing process may occur at a temperature in a range of 800° C. to 850° C.

In some embodiments, the macrocomposite may be annealed. Annealing may prevent the formation of permanent stresses within the glass that could later have a negative impact on the strength and stability of the glass. In some embodiments, annealing temperature(s) may be selected according to the $T_g$ of glass and/or the thickness, volume, and shape complexity of the macrocomposite. In some embodiments, the annealing temperature may be within 5° C., within 10° C., or within 15° C. of the $T_g$ of the glass. In some embodiments, the annealing temperature may be 330° C., 340° C., 350° C., 360° C., 370° C., 380° C., 390° C., or 400° C.

In some embodiments, the annealing time may be selected with reference to the glass volume and/or the stone volume. For example, if the stone is larger relative to the volume of the glass, a slower rate of cooler may be indicated. In some embodiments, the macrocomposite may be annealed for at least 2 hours, at least 2.5 hours, at least 3 hours, at least 3.5 hours, or at least 4 hours. In some embodiments, the macrocomposite may be annealed for up to 3 hours, up to 3.5 hours, up to 4 hours, up to 4.5 hours, or up to 5 hours.

In some embodiments, an annealing time-temperature curve may be selected depending on the thickness and/or volume of the glass-stone item and relative thickness and/or volume of the stone to the glass. In some embodiments, the higher the coefficient of thermal expansion for the macrocomposite, the longer the time of annealing. General guidelines for annealing conditions are described for example in: Inorganic Glasses: Commercial Glass Families, Applications, and Manufacturing Methods. Thomas P. Seward III and Arun K. Varshneya, Chapter 6 in Handbook of Ceramics, Glasses, and Diamonds, C.A. Harper, ed., New York, 2001. In some embodiments, the time and temperature of an annealing time-temperature curve may be selected according to ASTM C336-71 (2015). The duration of macrocomposite treatment at an annealing temperature may range from minutes to 15 hours, depending on the given coefficient of thermal expansion of the items in the macrocomposite.

The macrocomposite may be cooled in a controlled manner. For example, the macrocomposite may be cooled from the annealing temperature to room temperature at a cooling rate dependent on the thermal expansion coefficient of the macrocomposite, the volume of the glass, and/or the volume of the stone. In some embodiments, the temperature of the macrocomposite and/or a furnace including the macrocomposite may be cooled at a certain number of degrees per hour. In some embodiments, of the macrocomposite and/or a furnace including the macrocomposite may be cooled at rate of 20° C. per hour and/or a rate of 50° C. per hour. The higher the thermal expansion coefficient and the larger the volume of the macrocomposite, the slower the cooling process. In some embodiments, it is preferred to cool the macrocomposite to 150° C. at a rate of 0.5° C. to 5° C. per minute. In some embodiments, the cooling rate may be as low as 0.2° C. per minute. In some embodiments, it is preferred to allow the rate of cooling the macrocomposite from 150° C. to room temperature to be dictated by self-cooling of the furnace without the intervention of a power supply.

Stone-Glass Macrocomposites

In one aspect, this disclosure describes macrocomposites that include a combination of a glass and stone, wherein a polymer, resin, or adhesive is not used at the interface. The stone-glass macrocomposite may, in some embodiments, further include a metal.

Stone in Glass

In one aspect, this disclosure describes macrocomposites that include a combination of a glass and stone, wherein the stone is dispersed or immersed, fully or partially, in the glass.

The stone may be in any conformation that may be dispersed, immersed, or partially immersed in glass. The stone may include a single piece or multiple pieces. In some embodiments, the stone may include, for example, one or more of the following forms: grit; gravel; a powder; a fiber; a slab; a chunk and/or an irregular or regular geometric form such as a sphere, a hexahedron, a cylinder, a pane, etc. The stone or at least some of the pieces of the stone may be dispersed throughout the glass, concentrated in a particular area, and/or positioned according to a configuration specified by a given design. In some embodiments, the stone is entirely immersed in the glass. In some embodiments, a portion of the stone is partially immersed in the glass. In embodiments, where the stone includes multiple pieces, the pieces of the stone may be immersed in the glass, the pieces of the stone may be partially immersed in the glass, or some of the pieces of the stone may be partially immersed in the glass and some of the pieces of the stone may be entirely immersed in the glass. In some embodiments, the stone may be ground and/or polished to a required thickness and surface texture before coming into contact with the glass.

In some embodiments, small-grain stone pieces may be used. The small-grain stone pieces may be, for example, up to 1 mm, up to 2 mm, up to 3 mm, or up to 4 mm in diameter. The small-grain stone pieces may be, for example, at least 0.1 mm, at least 0.5 mm, at least 0.7 mm, or at least 1.0 mm in diameter. In some embodiments, small-grain stone pieces may be prepared from magmatic rock.

In some embodiments, the stone may be dispersed within glass in a manner similar to that used during the manufacture of tableware, as described, for example, in Chapter 14, The Principles of Glassworking, in S. R. Scholes, Modern Glass Practice, 1975. In some embodiments, during the manufacture of a stone-glass macrocomposite, a stone grit or powder is spread on a steel plate, then gathered by a rolling of the portion of hot glass. The glass may have a viscosity of $10^3$ dPas to $10^8$ dPas during the shaping process.

In some embodiments, the stone may be added into a mold during molten glass casting.

In some embodiments, a method of stone-glass macrocomposite formation includes pretreating the stone prior to dispersing or immersing the stone in the glass. Raw untreated stones typically are, in many embodiments, not ready for contact with molten glass. Water bound inside their structure, organic residues, and air-filled pore systems may be sources of gases that create bubbles in molten glass. When bubbles in the glass are an undesired effect, then the use of thermal pretreatment may be used to abrogate bubble formation. Without wishing to be bound by theory, it is believed that in the case of closed pores filled with air or other gases, thermal pretreatment causes small breakage in stones, enabling closed pores to establish connections with an open pore system, allowing them to be filled by molten glass after stone insertion into the glass, allowing impurity-causing bubbles to escape from the glass while it is still molten.

Pretreatment may include any of the pretreatments described herein including, for example, thermal pretreatment. Pretreatment may include preheating the stone to a temperature of up to 300° C., up to 400° C., up to 500° C., up to 520° C., up to 540° C., up to 560° C., up to 580° C., up to 600° C., up to 700° C., up to 800° C., up to 900° C., up to 1000° C., or up to 1100° C. In some embodiments, the stone may be preheated immediately before combining the stone and the glass.

In some embodiments, for example in the case of a stone larger than a few millimeters, where a thermal shock may cause damage to the stone, the stone may be preheated to up to 50° C., up to 100° C., up to 150° C., up to 200° C., up to 250° C., or up to 300° C. lower than the temperature of the molten glass. In some embodiments, the temperature of the stone may be selected with reference to the temperature at which the glass reaches the viscosity suitable for the selected shaping technique.

In some embodiments, treating the stone with a phosphate solution includes heating the stone in an aqueous solution that includes sodium phosphate or potassium phosphate or lithium phosphate. In some embodiments, treating the stone with a phosphate solution includes heating the stone in an aqueous solution acidified with an orthophosphoric acid of at least one of calcium phosphate, zinc phosphate, and aluminum phosphate.

In some embodiments, including, for example, to minimize the risk of gas bubble generation during macrocomposite formation resulting from the contact of porous stone with hot glass melt, it may be preferred to replace the air found in the pores of the stone with a phosphate salt or a phosphate glass deposit. To minimize bubble generation, the stone may be pretreated with a phosphate solution and/or by preheating the stone.

In some embodiments, the stone may be treated with a phosphate solution as follows. The stone is placed in an aqueous solution including sodium phosphate and/or potassium phosphate and/or lithium phosphate or an aqueous solution acidified with orthophosphoric acid of calcium dihydrogen phosphate, zinc phosphate, and/or aluminum phosphate. Subsequently, the aqueous solution, with the stone inside, is boiled for 0.5 hours to 10 hours. The stone is then taken out of the aqueous solution.

In some embodiments, the stone may be immersed in a glass. In some embodiments, the stone may be pretreated in an aqueous solution prior to immersion in the glass. In some embodiments, the stone may be directly immersed in glass, without prior pretreatment in an aqueous solution.

Because a macrocomposite may be formed by heating phosphate glass to a temperature at least 200° C. lower and up to 400° C. lower than the temperatures required for silicate glass, in some embodiments, the use of phosphate glass is preferred. In some embodiments, the use of a glass including components such as phosphate glass that permit the use of lower temperatures at the time of forming a macrocomposite allows the avoidance of high temperature treatment of stone that may cause cracking.

For example, when the glass is shaped by casting the viscosity range may be $10^2$ dPas to $10^8$ dPas; when glass is shaped by blowing, the viscosity range may be $10^3$ dPas to $10^5$ dPas; when glass is shaped by pressing or rolling, the viscosity range may be $10^3$ dPas to $10^8$ dPas. The viscosities corresponding to the forming range may be from $10^5$ times to $10^{10}$ times lower than the viscosities of the glass at the glass $T_g$, and the temperature at which the glass attains those viscosity values will depend on the chemical composition of the glass.

In some embodiments, the glass of the macrocomposite may include a float glass. In some embodiments, float glass includes a sheet of glass prepared by a float method including, for example, by floating molten glass on a bed of molten metal. In some embodiments, the stone may be dispersed within a sheet glass plate in a manner similar to that used in the fusing of float glass panels. In some embodiments, fusing may be performed as described by Brad Walker in Contemporary Fused Glass.

In some embodiments, a stone may be fused to a float glass. In some embodiments, the stone may have a matching coefficient of thermal expansion with the float glass. A glass having a matching coefficient of thermal expansion with the stone in the macrocomposite may, in some embodiments, be a borosilicate type 3.3 sheet glass including for example, BOROFLOAT. In some embodiments, the glass may have a thermal expansion coefficient of $33 \times 10^{-7}$ $K^{-1}$ at a temperature in a range of 20° C. to 300° C., a $T_g$ of 525° C., and a $T_{Lit}$ of 820° C. In some embodiments, macrocomposite including borosilicate glass type 3.3 may be combined with stones having a thermal expansion coefficient in a range of $28 \times 10^{-7}$ $K^{-1}$ to $38 \times 10^{-7}$ $K^{-1}$ at a temperature in a range of 20° C. to 300° C. Stones having a thermal expansion coefficient in a range of $28 \times 10^{-7}$ $K^{-1}$ to $38 \times 10^{-7}$ $K^{-1}$ at a temperature in a range of 20° C. to 300° C. may include, for example, diabase, mica and gneisses.

In some embodiments, a macrocomposite may be formed with an aluminosilicate flat glass which has a thermal expansion coefficient of $46 \times 10^{-7}$ $K^{-1}$ at a temperature in a range of 20° C. to 300° C., a $T_g$ of 715° C., and a $T_{Lit}$ of 910° C. A macrocomposite including an aluminosilicate flat glass may be combined with stones having a thermal expansion coefficient of $40 \times 10^{-7}$ $K^{-1}$ to $52 \times 10^{-7}$ $K^{-1}$ at a temperature in a range of 20° C. to 300° C. including, for example, some types of basalt, mica, and/or slates. In some embodiments, the glass and stone may be combined together using a fusing process at a temperature in a range of 1050° C. to 1200° C.

In some embodiments, including, for example, in the case of stones exhibiting a thermal expansion coefficient in a range of $60 \times 10^{-7}$ K$^{-1}$ to $100 \times 10^{-7}$ K$^{-1}$ (including, for example, some kinds of basalt, gabbro, mica, ruby, sapphire, and/or granite), solder phosphate glass may be used for float glass sandwiching. In some embodiments, a solder phosphate glass may have a thermal expansion coefficient in a range of $80 \times 10^{-7}$ K$^{-1}$ to $95 \times 10^{-7}$ K$^{-1}$ and a seal temperature not higher than the float glass $T_g$. For example, the seal temperature may be less than 550° C., less than 500° C., or less than 450° C.

In some embodiments, a glass panel, including a glass panel coated with decorative colored glass-stone composition, may be heated to a temperature of up to 800° C., up to 810° C., up to 820° C., up to 830° C., up to 840° C., up to 850° C., up to 900° C., up to 950° C., up to 1000° C., up to 1050° C., or up to 1100° C. In some embodiments, the glass and stone may be combined together using a fusing process at temperatures in a range of 900° C. to 1050° C. In such macrocomposites including a float glass, including macrocomposites formed using fusing process at a temperature in a range of 800° C. to 840° C., the surface of an optically smooth float glass may be irreversibly spoiled.

In some embodiments, including when the macrocomposite includes a float glass, the macrocomposite may further include an additional glass. For example, a macrocomposite may include a second glass, a third glass, a fourth glass, etc. In some embodiments, at least one additional glass may be a solder glass. The additional glass may be in the form of a powder, a frit, a grain, a rod, a fiber, a stripe, a thin plate, or another processed form suitable for the application. The additional glass may be used to bind the stone and float glass together into a compact and rigid unit. In some embodiments, the additional glass may be located between the stone and the float glass. In some embodiments, the additional glass may include a colored glass.

In some embodiments, an additional glass may have a Littleton softening point ($T_{Lit}$) less than the glass transition temperature ($T_g$) of the float glass. Without wishing to be bound by theory, it is believed that the second glass having a $T_{Lit}$ less than the $T_g$ of the float glass promotes the maintenance of surface integrity of the glass. In some embodiments, the $T_{Lit}$ of the second glass may be up to 550° C. In some embodiments, it is preferred for the $T_g$ for the second glass to be up to 450° C. In some embodiments, the glass preferably has a chemical durability that meets the standards of US Pharmacopeia type III glass.

To maintain an optically smooth surface, a phosphate glass having a $T_g$ lower than the $T_g$ of a float glass may be used as an additional glass. Without wishing to be bound by theory, it is believed that using phosphate glass in a stone-float glass macrocomposite allows the sealing process to take place at temperature significantly less than the $T_g$ of float glass, preserving the optically smooth glass surface of the float glass.

For example, stone elements may be placed and/or distributed in float glass plates. For example, a hole in a glass plate in the shape of the stone insert may be cut (for example, using a water jet). After cleaning of the edges of the insert and the hole, the stone may be placed into the hole in the glass, and the gap between glass and the insert may be filled with an additional glass.

In some embodiments, the gap between the stone and the float glass may be filled with one or more additional glasses (for example, solder glass) having a thermal expansion coefficient between the thermal expansion coefficient of the stone and the thermal expansion coefficient of the float glass. In some embodiments, the gap between a stone and a float glass may be filled on the stone side with a second glass that has a thermal expansion coefficient closer to that of the stone, and on the glass side with a third glass that has thermal expansion coefficient closer to that of float glass (for example, $80 \times 10^{-7}$ K$^{-1}$ to $95 \times 10^{-7}$ K$^{-1}$).

In some embodiments, including when at least a portion of the glass of a macrocomposite is in solid state before being placed in contact with the stone, the macrocomposite may further include an additional glass. For example, a macrocomposite may include a second glass, a third glass, a fourth glass, etc. In some embodiments, a cut wider than the size of the stone to be inserted may be made and the gap between the stone insert and the glass may be filled with one or more additional glasses. The one or more additional glasses may have a thermal expansion coefficient between the thermal expansion coefficient of the stone and the thermal expansion coefficient of the glass. In some embodiments, in which the thermal expansion coefficient of the stone is higher than the thermal expansion coefficient of the glass in solid state, a second and third glass may fill the gap between a stone insert and a float glass, wherein the second glass has a higher thermal expansion coefficient on the stone insert side, and a third glass has a lower thermal expansion coefficient on the float glass side. In some embodiments, in which the thermal expansion coefficient of the stone is lower than the thermal expansion coefficient of the glass in solid state, a second and third glass may fill the gap between a stone and a float glass, wherein the second glass has a lower thermal expansion coefficient on the stone insert side, and a third glass has a higher thermal expansion coefficient on the float glass side.

In some embodiments, the macrocomposite may include a second glass, a third glass, a fourth glass and/or a fifth glass, wherein the second glass, third glass, fourth glass and/or fifth glass are on a surface of the glass opposite the stone. Such additional glass may, in some embodiments encase the macrocomposite. By encasing the macrocomposite, the macrocomposite may be further protected from mechanical damage including damage that, for example, results from thermal shock during use of the macrocomposite.

The three-dimensional macrocomposites with glass matrix of high refractive index and inserts of stones with unprocessed surfaces (very often shaped in natural processes such as: repeated dissolution and deposition, glacier crazing, water abrasion, local crystallization, slow oxidation, slow corrosion, sulphurisation, etc.) display multiple light reflection, dispersion and refraction. In some embodiments, due to the described properties, ordinary stones such as sandstone, which exhibit a matte and dull surface when exposed to air, acquire a lustrous sheen after insertion into phosphate glass matrix. The change in visual quality may be a result of the large optical density difference at the interfacial glass-to-stone boundary.

Metal and Stone in Glass

In a further aspect, this disclosure describes macrocomposites that include a combination of a glass, stone, and a metal, wherein the stone and metal are dispersed or immersed, fully or partially, in the glass. Both the stone and the metal have a volume that may be seen by an unaided human eye.

Any suitable stone-metal-glass combination may be included in a macrocomposite. In some embodiments, the metal may be selected and/or incorporated in the composite according to co-pending application METAL-GLASS MACROCOMPOSITES AND COMPOSITIONS AND METHODS OF MAKING, having the same inventors as the present application, and filed on the same day as the present application.

In some embodiments, the metal may preferably include iron and/or a steel. In some embodiments, the stone may preferably include at least one of sandstone, petrified wood, and a slate. Without wishing to be bound by theory, sandstone, petrified wood, and slates have similar thermal expansion coefficients to iron and some steel, and may, in some embodiments, have comparable dilatometric characteristics in the temperature range used in stone-glass macrocomposites, enabling the formation of macrocomposites that include glass, stone, and metal.

In some embodiments, the metal may preferably include kovar alloy. In some embodiments, the stone may include a ruby and/or a sapphire may be combined. In an embodiment including a ruby and/or a sapphire and a kovar alloy, an aluminosilcate or boro-aluminosilicate glass may be used. In some embodiments, the glass may preferably have a coefficient of thermal expansion in a range of $50 \times 10^{-7}$ $K^{-1}$ to $75 \times 10^{-7}$ $K^{-1}$. Without wishing to be bound by theory, ruby and sapphire, being alumina precious stones, are believed to be resistant to temperatures at which silicate glass obtains a viscosity low enough for macrocomposite shaping.

In some embodiments, the stone and metal may be immersed in molten/viscous glass. In some embodiments, metal and stone may be freely dispersed or immersed within a glass matrix.

In some embodiments, glass may be cast directly onto a previously prepared stone-metal construction, or onto stone-metal elements arranged in a composition. In some embodiments, a stone-metal construction or stone-metal elements may include sandstone and steel.

In some embodiments stone and/or metal may be at least one of grinded, polished, cut, and drilled. Metal may be inserted into stone or stone may be inserted into metal. Stone and metal may be also paired by surfaces. A metal-stone joint may be tightly or loosely fitted. In embodiments when a metal-stone joint is loosely fitted, any gap or gaps between stone and metal may be filled with viscous glass during metal-stone-glass macrocomposite processing.

In some embodiments, the metal or stone or both may be pretreated prior to contacting the glass. Because stone including, for example, sandstone, may be sensitive to thermal shock but resistant to oxidation and because metal including, for example, steel, exhibits much higher thermal conductivity and reasonable susceptibility to oxidation, pretreatment of stone and metal may, in many embodiments, be done separately. When a macrocomposite includes rusted or oxidized iron or steel, steel and sandstone may be preheated together, but even in such circumstances, due to faster temperature diffusion across metal than across stone, heating rate should be small (for example, 1° C. to 2° C. per min) or free space between both materials should be maintained during preheating. In some embodiments, the upper temperature limit for the thermal pretreatment of metal may be defined by the accepted or desired appearance of the metal surface.

In some embodiments, at the time of macrocomposite formation, a stone may be preheated as further described herein. In some embodiments, at the time of macrocomposite formation, a metal may be room-temperature. In embodiments wherein the stone is preheated and the metal is at room temperature, a gap is preferably maintained between the stone and metal.

In some embodiments, phosphate glasses are most preferred for stone-metal-glass macrocomposites. In some embodiments, a phosphate glass having a glass transition temperature below 500° C., preferably below 450° C., and more preferably below 400° C. may be used. In some embodiments, a phosphate glass may have a coefficient of thermal expansion in a range of $80 \times 10^{-7} K^{-1}$ to $130 \times 10^{-7}$ $K^{-1}$ at temperature range within 20° C. of the $T_g$ of glass.

Glass in Stone

In another aspect, this disclosure describes macrocomposites that include a combination of a glass and stone, wherein glass is dispersed or immersed, fully or partially, in stone. In some embodiments, the stone may be a magmatic rock including, for example, basalt, melaphyre, obsidian, and/or gabbro. In some embodiments the stone may be sedimentary rock including, for example, striped flint. In some embodiments the stone may be metamorphic rock.

In some embodiments, a stone that is naturally highly porous may be a preferred candidate for a glass-in-stone macrocomposite. In some embodiments, a stone with easily leached phases may be a preferred candidate for a glass-in-stone macrocomposite. Minerals such as kaolinite, illite, and montmorillonite (commonly called clays) are often a doping phase in sandstones. Carbonates, typically limestone, are frequently detected in sandstones. Both groups of sandstone contaminants may be easily leached, including, for example, by washing with water and/or by dissolution in acetic acid. Spaces in the stone including, for example, secondary pores (macropores) in sandstones revealed after the treatment may be filled with glass.

Clays may be removed from sandstones by slow water washing at ambient temperature or in boiled water, but for complete cleaning of sandstone from clay contamination, steam hydrothermal treatment in autoclave may be preferred. In some embodiments, removal of carbonates may be performed by acetic acid steam hydrothermal treatment in an autoclave.

In some embodiments, clay-free and carbonate-free stone may be used for a glass-in-stone macrocomposite, and naturally made or artificially made voids and any concave areas may be filled with glass. In some embodiments, at least one void and/or concave area has a diameter of at least 1 mm. In some embodiments, at least one void and/or concave area has a volume of at least 1 $mm^3$.

Any of the glass compositions described herein may be used for a glass-in-stone macrocomposite. In some embodiments, phosphate glass may be preferred. In some embodiments, a dilatometric characteristic of glass may preferably be compatible with the stone. Such compatibility may enhance the successful binding of the two materials.

In some embodiments, it is may be preferable that the manufacture process of the macrocomposite is performed at the lowest possible temperature, allowing the avoidance of high temperature treatment of stone that may cause cracking.

In some embodiments, the temperature difference between the glass and the stone at the moment of contact may be selected with reference to the thermal expansion coefficient of the stone and the thermal expansion coefficient of the glass. The lower the difference between the thermal expansion coefficient of the stone and the glass, and the more compatible the thermal diffusivity and the greater the potential temperature difference. In some embodiments, the temperature difference between the stone and glass at the time of stone-glass contact may be up to 100° C., up to 200° C., up to 300° C., up to 400° C., or up to 500° C.

In some embodiments, the glass may be cast, blown, or mechanically pressed into the holes and/or pores within the stone. After filling the holes and/or pores with glass, and, in some embodiments reheating, the macrocomposite may be immediately subjected to a cooling process.

EXAMPLES

All reagents, starting materials, and solvents used in the following examples were purchased from commercial suppliers (such as Stanlab Sp. J., Lublin, Poland) and were used without further purification unless otherwise indicated.

Example 1. Sandstone-Glass Macrocomposite

Sandstone Preparation/Pretreatment

The sandstone of Polish provenance was cut using angle grinder with a diamond disc, into a piece measuring 25 millimeter (mm)×20 mm×12 mm.

The stone was gradually heated to 540° C. over a period of 3.5 hours, held at 540° C. for 10 hours, and then cooled to room temperature, as dictated by natural cooling of the closed furnace.

Immediately preceding macrocomposite formation, the stone was heated according to the following protocol: 0° C. to 400° C. over 3 hours, and then held at 400° C. for 2 hours.
Glass Composition Preparation The components and proportions of the glass composition are shown in Table 4. A 210 gram (g) batch was milled to ensure uniform melt, transferred with a spoon into a 200 milliliter (ml) glazed porcelain crucible at room temperature, and enclosed in a protective cover of two larger crucibles made of bisque porcelain.

TABLE 4

| Compound | Mass Percent (Weight Percent) |
| --- | --- |
| ZnO | 39.55 |
| $P_2O_5$ | 46.06 |
| $Al_2O_3$ | 2.13 |
| $TiO_2$ | 0.33 |
| $Na_2O$ | 5.84 |
| $K_2O$ | 6.09 |

Melting Procedure

The glass was heated according to the following protocol: 0° C. to 200° C. over 40 minutes, 200° C. to 400° C. over 40 minutes, 400° C. to 800° C. over 40 minutes, 800° C. to 1150° C. over 60 minutes, and then held at 1150° C. for 120 minutes in a furnace (having approximately 5 kilowatts (kW) power).
Casting Procedure:

The melt was allowed to cool from 1150° C. to 850° C., as dictated by natural cooling of the closed furnace. At 850° C., the glass was cast into a cylindrical mold measuring 6 centimeters (cm) in diameter, and 7 cm in height that had been preheated to 400° C. When the glass cooled to 600° C., the stone, preheated to 400° C., was inserted into the glass. The macrocomposite, at an observed temperature of 550° C., was transferred to the annealing furnace immediately after the stone was inserted in the glass, and treated as described below.
Annealing Procedure The macrocomposite was inserted into an annealing furnace (having approximately 3 kilowatts (kW) power) operating at 400° C. and annealed at 370° C. for 3.5 hours. The temperature curve was set to decrease temperature at a rate of 20° C. per hour, from 370° C. to 300° C., then 50° C. per hour from 300° C. to 100° C. The furnace was switched off at 100° C. and left to cool to room temperature, with the cooling time dictated by self-cooling of the furnace without the intervention of a power supply. The parameters were selected to prevent the formation of stresses within the macrocomposite that could negatively impact its strength and stability.

A representative image of the resulting macrocomposite may be seen in FIG. 1.

Example 2. Sandstone-Glass Macrocomposite

Sandstone Preparation/Pretreatment:

A sandstone of Indian provenance was cut using angle grinder with a diamond disc, into a piece measuring 30 mm×25 mm×25 mm.

The stone was gradually heated to 540° C. over a period of 3.5 hours, held at 540° C. for 10 hours, and then cooled to room temperature, as dictated by natural cooling of the closed furnace.

Immediately preceding macrocomposite formation, the stone was heated according to the following protocol: 0° C. to 400° C. over 3 hours, and then held at 400° C. for 2 hours.
Glass Composition Preparation The components and proportions of the glass composition are shown in Table 6. A 210 g batch was milled to ensure uniform melt, transferred with a spoon into a 200 ml glazed porcelain crucible at room temperature, and enclosed in a protective cover of two larger crucibles made of bisque porcelain.
Melting Procedure:

The glass was heated according to the following protocol: 0° C. to 200° C. over 40 minutes, 200° C. to 400° C. over 40 minutes, 400° C. to 800° C. over 40 minutes, 800° C. to 1150° C. over 60 minutes, and then held at 1150° C. for 120 minutes.
Casting Procedure:

The melt was allowed to cool from 1150° C. to 850° C., as dictated by natural cooling of the closed furnace. At 850° C., the glass was cast into a cylindrical mold measuring 6 cm in diameter and 7 cm in height that had been preheated to 400° C. When the glass cooled to 600° C., the stone, preheated to 400° C., was inserted into the glass. The macrocomposite, at an observed temperature of 550° C., was then partially removed from the cylindrical mold to allow the glass to form an irregular shape from one side, and was then transferred to the annealing furnace and treated as described below.
Annealing Procedure:

The macrocomposite, partially within the mold, was inserted into an annealing furnace operating at 400° C. and annealed at 370° C. for 3.5 hours. The temperature curve was set to decrease temperature at a rate of 20° C. per hour, from 370° C. to 300° C., then 50° C. per hour from 300° C. to 100° C. The furnace was switched off at 100° C. and left to cool to room temperature, with the cooling time dictated by self-cooling of the furnace without the intervention of a power supply.

Figure 2:
FIG. 2 shows a perspective view of an irregular sandstone chunk, partially immersed and suspended in an irregular cast glass shape; made as described in Example 2.

A representative image of the resulting macrocomposite may be seen in FIG. 2.

Example 3. Petrified Wood-Glass Macrocomposite

Petrified Wood Preparation and Pretreatment

A petrified wood specimen of Polish provenance was cut using an angle grinder with a diamond disc, into a piece measuring 30 mm×20 mm×15 mm.

The piece of petrified wood was then gradually heated to 520° C. over a period of 3.5 hours, held at 520° C. for 5 hours, and then cooled to room temperature, as dictated by natural cooling of the closed furnace.

Immediately preceding macrocomposite formation, the petrified wood was heated again according to the following protocol: 0° C. to 400° C. over 3 hours, then held at 400° C. for 2 hours.

Glass Composition Preparation.

The components and proportions of the glass composition are shown in Table 5. A 210 g batch was milled to ensure uniform melt, transferred with a spoon into a 200 ml glazed porcelain crucible at room temperature, and enclosed in a protective cover of two larger crucibles made of bisque porcelain.

TABLE 5

| Compound | Mass Percent (Weight Percent)t |
|---|---|
| ZnO | 40.59 |
| $P_2O_5$ | 44.79 |
| $Al_2O_3$ | 2.08 |
| $TiO_2$ | 0.33 |
| $Na_2O$ | 5.38 |
| $K_2O$ | 3.98 |
| CaO | 2.85 |

Melting Procedure:

The glass was heated according to the following protocol: 0° C. to 200° C. over 40 minutes, 200° C. to 400° C. over 40 minutes, 400° C. to 800° C. over 40 minutes, 800° C. to 1150° C. over 60 minutes, and then held at 1150° C. for 120 minutes.

Casting Procedure:

The melt was allowed to cool from 1150° C. to 840° C., as dictated by natural cooling of the closed furnace. At 840 C, the melt was cast into a cylindrical mold measuring 6 cm in diameter, and 7 cm in height, that had been preheated to 400° C. The stone, preheated to 400° C., was inserted into the glass when the glass cooled to 600° C. from 1150° C. The macrocomposite, at observed temperature 550° C., was transferred to the annealing furnace immediately after the stone was inserted in the glass, and treated as described below.

Figure 3:
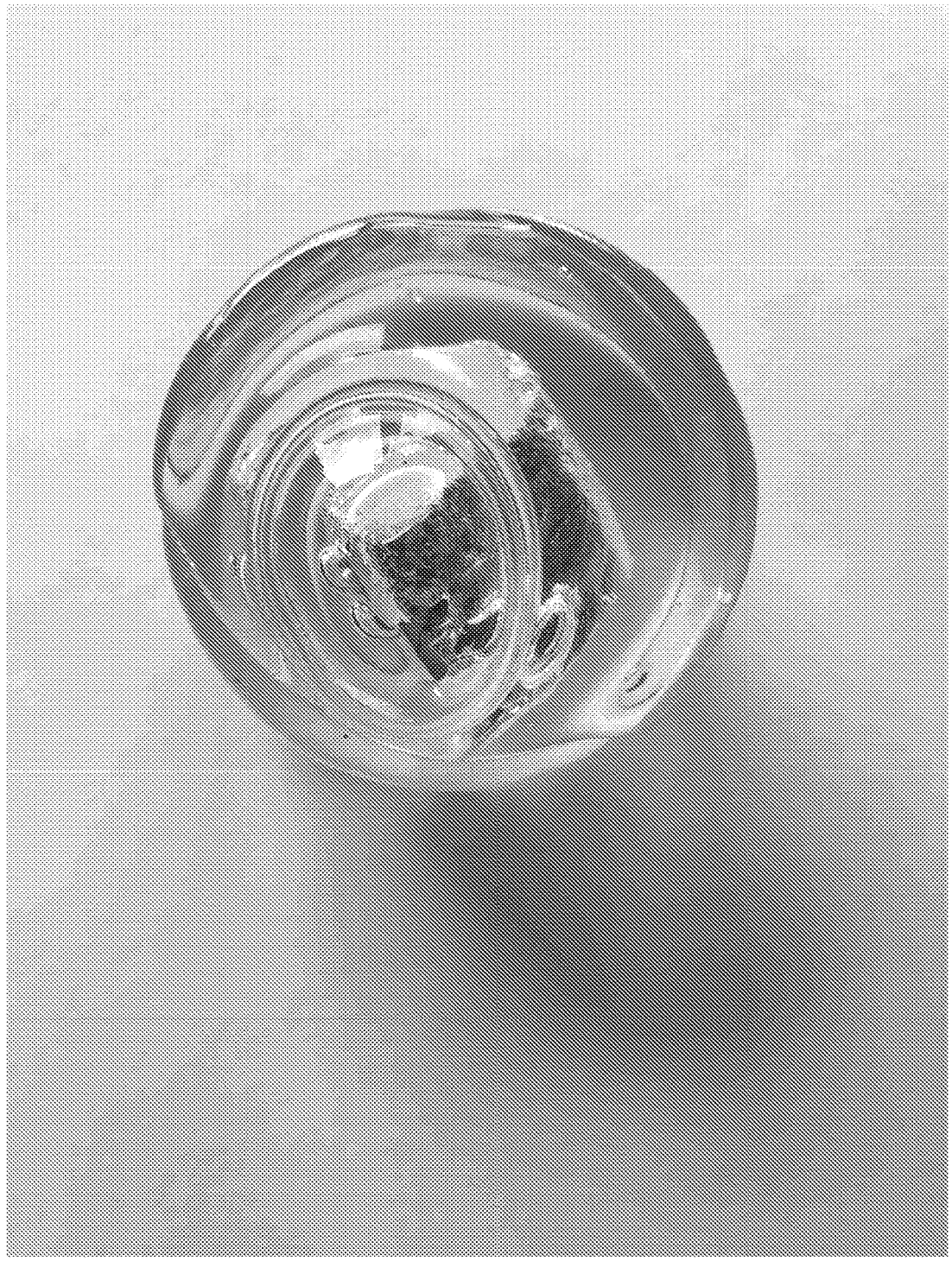
FIG. 3 shows a top view of a petrified wood segment, fully immersed and suspended in a cast glass cylinder, with a magnifying glass bubble at the top; made as described in Example 3.

Annealing Procedure:

A mold with the macrocomposite was inserted into an annealing furnace operating at 400° C. and annealed at 360° C. for 3.5 hours. The furnace was set to decrease temperature at a rate of 20° C. per hour, from 360° C. to 310° C., then 50° C. per hour from 370° C. to 100° C. The furnace was switched off at 100° C. and left to cool to room temperature, with the cooling time dictated by self-cooling of the furnace without the intervention of a power supply. The parameters were selected to prevent the formation of stresses within the macrocomposite that could negatively impact its strength and stability A representative image of the resulting macrocomposite may be seen in FIG. 3.

Example 4. Aventurine-Glass Macrocomposite

Aventurine Preparation and Pretreatment

An aventurine specimen was cut using an angle grinder with a diamond disc, into an irregular piece measuring 15 mm by 20 mm by 10 mm.

The stone was gradually heated to 520° C. over a period of 3.5 hours, held at 520° C. for 5 hours, and then cooled to room temperature, as dictated by natural cooling of the closed furnace.

Immediately preceding macrocomposite formation, the aventurine was heated again according to the following protocol: 0° C. to 400° C. over 3 hours, then held at 400° C. for 2 hours.

Glass Composition Preparation

The components and proportions of the glass composition are shown in Table 6. A 210 g batch was milled to ensure uniform melt, transferred with a spoon into a 200 ml glazed porcelain crucible at room temperature, and enclosed in a protective cover of two larger crucibles made of bisque porcelain.

TABLE 6

| Compound | Mass Percent (Weight Percent) |
|---|---|
| ZnO | 38.41 |
| $P_2O_5$ | 44.75 |
| $Al_2O_3$ | 2.07 |
| $TiO_2$ | 0.33 |
| $Na_2O$ | 5.67 |
| $K_2O$ | 5.92 |
| CaO | 2.85 |

Melting Procedure

The glass was heated according to the following protocol: 0° C. to 200° C. over 40 minutes, 200° C. to 400° C. over 40 minutes, 400° C. to 800° C. over 40 minutes, 800° C. to 1150° C. over 60 minutes, and then held at 1150° C. for 120 minutes.

Casting Procedure

The melt was allowed to cool from 1150° C. to 840° C., as dictated by natural cooling of the closed furnace. At 840° C., the glass was cast into a cylindrical mold measuring 6 cm in diameter, and 7 cm in height, that had been preheated to 400° C. When the glass cooled to 620° C., the stone, preheated to 400° C., was inserted into the glass. The macrocomposite, at an observed temperature 600° C., was transferred to the annealing furnace immediately after the stone was inserted in the glass, and treated as described below.

Annealing Procedure

Figure 4:
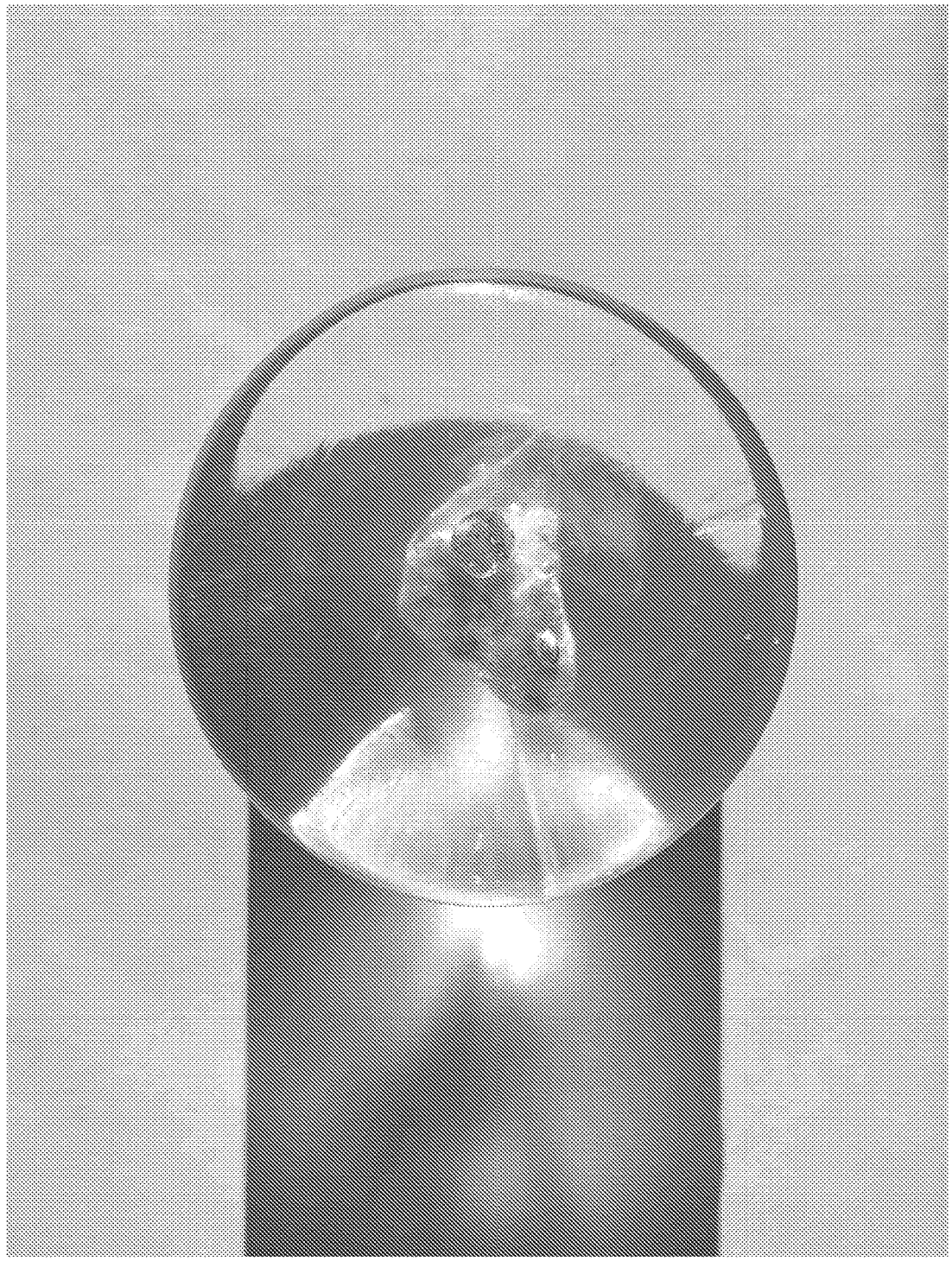
FIG. 4 shows a top view of an irregular aventurine stone, fully immersed and suspended in a cast glass cylinder; made as described in Example 4.

A mold with the macrocomposite was inserted into an annealing furnace operating at 400° C. and annealed at 370° C. for 3.5 hours. The furnace was set to decrease temperature at a rate of 20° C. per hour, from 370° C. to 320° C., then 50° C. per hour from 320° C. to 100° C. The furnace was switched off at 100° C. and left to cool to room temperature, with the cooling time dictated by self-cooling of the furnace without the intervention of a power supply. The parameters were selected to prevent the formation of stresses within the macrocomposite that could negatively impact its strength and stability A representative image of the resulting macrocomposite may be seen in FIG. 4.

Example 5. Trilobite Fossil-Glass Macrocomposite

Trilobite Fossil Preparation and Pretreatment

A trilobite fossil specimen was cut into an irregular piece measuring 30 mm×25 mm×15 mm using an angle grinder with a diamond disc.

The trilobite piece was then gradually heated to 520° C. over a period of 3.5 hours, held at 520° C. for 5 hours, and then cooled to room temperature, as dictated by natural cooling of the closed furnace.

Immediately preceding macrocomposite formation, the trilobite was heated again according to the following protocol: 0° C. to 400° C. over 3 hours, then held at 400° C. for 2 hours.

Glass Composition Preparation

The glass composition is shown in Table 7. A 210 g batch was milled to ensure uniform melt, transferred with a spoon into a 200 ml glazed porcelain crucible at room temperature, and enclosed in a protective cover of two larger crucibles made of bisque porcelain.

TABLE 7

| Compound | Mass Percent (Weight Percent) |
| --- | --- |
| ZnO | 40.59 |
| $P_2O_5$ | 44.79 |
| $Al_2O_3$ | 2.08 |
| $TiO_2$ | 0.33 |
| $Na_2O$ | 5.38 |
| $K_2O$ | 3.98 |
| CaO | 2.85 |

Melting Procedure

The glass was heated according to the following protocol: 0° C. to 200° C. over 40 minutes, 200° C. to 400° C. over 40 minutes, 400° C. to 800° C. over 40 minutes, 800° C. to 1150° C. over 60 minutes, and then held at 1150° C. for 120 minutes.

Casting Procedure

The melt was allowed to cool from 1150° C. to 840° C., as dictated by natural cooling of the closed furnace. At 840° C., the glass was cast into a cylindrical mold measuring 6 cm in diameter, and 7 cm in height that had been preheated to 400° C. When the glass cooled to 620° C., the stone, preheated to 400° C., was inserted into the glass. The macrocomposite, at observed temperature 600° C., was transferred to the annealing furnace immediately after the stone was inserted in the glass, and treated as described below.

Annealing Procedure

Figure 5:
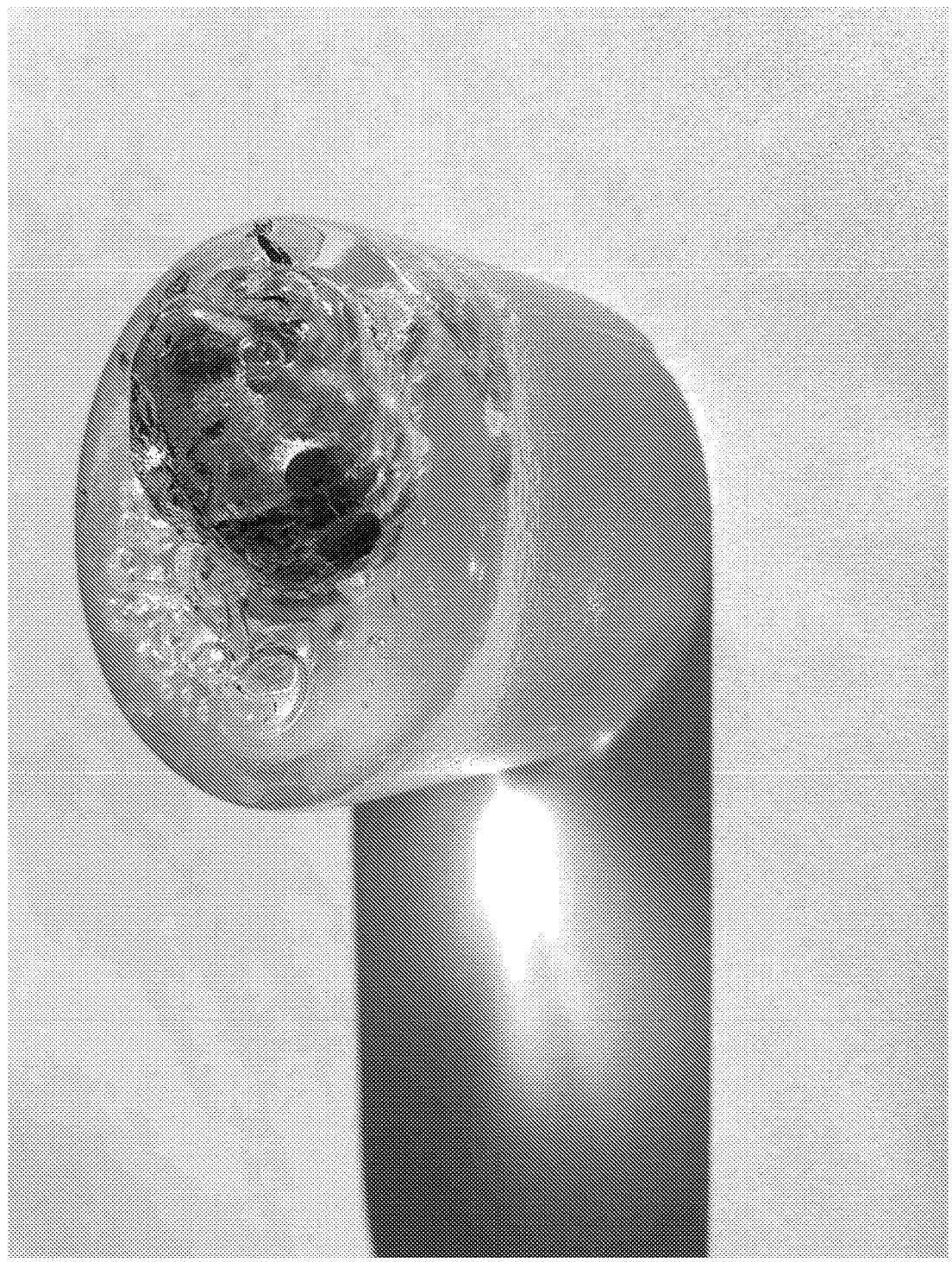
FIG. 5 shows a perspective view of a fossilized trilobite chunk, partially immersed in cast glass; made as described in Example 5.

A mold with the macrocomposite was inserted into an annealing furnace operating at 400° C. and annealed at 370° C. for 3.5 hours. The furnace was set to decrease temperature at a rate of 20° C. per hour, from 370° C. to 320° C., then 50° C. per hour from 320° C. to 100° C. The furnace was switched off at 100° C. and left to cool to room temperature, with the cooling time dictated by self-cooling of the furnace without the intervention of a power supply. The parameters were selected to prevent the formation of stresses within the macrocomposite that could negatively impact its strength and stability A representative image of the resulting macrocomposite may be seen in FIG. 5.

Example 6. Glass-in-Sandstone Macrocomposite

Sandstone Preparation and Pretreatment

A sandstone with clay (for example, minerals such as kaolinite, montmorillonite, illite, etc.) contamination is cut using an angle grinder with a diamond disc, into a rectangular piece measuring 230 mm×130 mm×20 mm.

After cutting, the stone is hydrothermally treated in 140° C. steam at a pressure of 4 bars for 24 hours to remove the clay and reveal any pores in the sandstone. After cooling to room temperature, stone is removed from the bath and washed with water. The stone is then dried at 120° C. by 5 hrs. The structural integrity of the stone after clay removal may be verified.

Glass Composition Preparation

The glass composition is shown in Table 8. A 210 g batch was milled to ensure uniform melt, transferred with a spoon into a 200 ml glazed porcelain crucible at room temperature, and enclosed in a protective cover of two larger crucibles made of bisque porcelain.

Melting Procedure

The glass is melted according to the following protocol: 0° C. to 200° C. over 40 minutes, 200° C. to 400° C. over 40 minutes, 400° C. to 800° C. over 40 minutes, 800° C. to 1100° C. over 60 minutes, and then held at 1100° C. for 120 minutes. The glass is cast into graphite mold and left to cool, without annealing.

Following the melting procedure, one portion of the pre-melted glass is ground to fine grains using ceramic pestle and mortar.

Another portion of the pre-melted glass is broken up with a pestle into small chunks measuring between 3 mm and 7 mm.

TABLE 8

| Compound | Mass Percent (Weight Percent) |
| --- | --- |
| ZnO | 40.59 |
| $P_2O_5$ | 44.79 |
| $Al_2O_3$ | 2.08 |
| $TiO_2$ | 0.33 |
| $Na_2O$ | 5.38 |
| $K_2O$ | 3.98 |
| CaO | 2.85 |

Macrocomposite Preparation and Annealing Procedure

The pores in the sandstone are filled with ground glass or glass chunks, depending on pore size. The sandstone and glass are then gradually heated to 540° C. over a period of 3.5 hours, held at 540° C. for 5 hours, and then cooled to 370° C., held at 370° C. for 3 hours for annealing and then cooled down to room temperature according to the following protocol: 370° C. to 300° C. over 4 hours, 300° C. to 200° C. over 3 hours, 200° C. to 100° C. over 2 hours. The furnace is then switched off at 100° C. and left to cool to room temperature, with the cooling time dictated by self-cooling of the furnace without the intervention of a power supply.

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of forming a macrocomposite, the method comprising:
   dispersing or immersing a stone in a glass, wherein the stone has a volume of greater than 0.1 $mm^3$;
   wherein the macrocomposite does not comprise an organic resin, an adhesive, or a polymer;
   wherein the stone comprises an igneous rock, a sedimentary rock, a metamorphic rock, petrified wood, a fossil, or a meteorite, or a combination thereof; and
   wherein the glass comprises a phosphate glass.

2. The method of claim 1, wherein the stone comprises multiple pieces, each piece having a volume of greater than 0.1 $mm^3$.

3. The method of claim 1, wherein the stone comprises sandstone, petrified wood, quartzite, or a trilobite.

4. The method of claim 3, wherein the quartzite comprises aventurine.

5. The method of claim 1, wherein the glass comprises ZnO and $P_2O_5$.

6. The method of claim 5, wherein the combined mass percent of ZnO and $P_2O_5$ is at least 60.

7. The method of claim 1,
wherein the glass comprises $Na_2O$, $K_2O$, $Li_2O$, CaO, MgO, or BaO, or a combination thereof, and $Al_2O_3$, $TiO_2$, $CeO_2$, $ZrO_2$, $Bi_2O_3$, or $SnO_2$, or a combination thereof, and wherein the molar ratio of $\Sigma(ZnO, CaO, MgO, BaO, Na_2O, K_2O, Li_2O):\Sigma(P_2O_5, Al_2O_3, TiO_2, ZrO_2, CeO_2, Bi_2O_3, SnO_2)$ is 2:1;
wherein the glass comprises ZnO, $P_2O_5$, $Na_2O$, $K_2O$, $Li_2O$, $Al_2O_3$, $Bi_2O_3$, $CeO_2$, $TiO_2$, $SnO_2$, CaO, MgO, and BaO in the ranges provided in Table 1 of the instant specification;
wherein the glass comprises ZnO, $P_2O_5$, $Na_2O$, $K_2O$, $Li_2O$, $Al_2O_3$, $Bi_2O_3$, $CeO_2$, $TiO_2$, and $SnO_2$, in the ranges provided in Table 2 of the instant specification; or
wherein the glass comprises ZnO, $P_2O_5$, $Al_2O_3$, $TiO_2$, $Na_2O$, $K_2O$, CaO, and $Fe_2O_3$ in the ranges provided in Table 3 of the instant specification.

8. The method of claim 1,
wherein the stone comprises sandstone, and the glass has a thermal expansion coefficient in a range of $85\times10^{-7}$ $K^{-1}$ to $135\times10^{-7}K^{-1}$;
wherein the stone comprises basalt, and the glass has a thermal expansion coefficient in a range of $30\times10^{-7}$ $K^{-1}$ to $75\times10^{-7}K^{-1}$;
wherein the stone comprises petrified wood, and the glass has a thermal expansion coefficient in a range of $85\times10^{-7}$ $K^{-1}$ to $135\times10^{-7}K^{-1}$;
wherein the stone comprises a trilobite, and the glass has a thermal expansion coefficient in a range of $85\times10^{-7}$ $K^{-1}$ to $135\times10^{-7}K^{-1}$; or
wherein the stone comprises quartzite, and the glass has a thermal expansion coefficient in a range of $90\times10^{-7}$ $K^{-1}$ to $140\times10^{-7}$ $K^{-1}$.

9. The method of claim 1, wherein the method further comprises pretreating the stone prior to dispersing or immersing the stone in the glass, wherein the pretreatment comprises preheating the stone to a temperature of up to 1100° C.

10. The method of claim 1, wherein the temperature of the glass at the time of dispersing or immersing the stone in the glass is at least 20° C. greater than the $T_g$ of the glass.

11. The method of claim 1, wherein the difference in the coefficients of thermal expansion between the stone and the glass is less than $35\times10^{-7}$ $K^{-1}$.

12. The method of claim 1, wherein the method further comprises annealing the glass after the glass is dispersed or immersed in the stone.

13. A method of forming a macrocomposite, the method comprising:
dispersing or immersing a stone in a glass, wherein the stone has a volume of greater than 0.1 mm³;
wherein the macrocomposite does not comprise an organic resin, an adhesive, or a polymer; and
wherein the stone comprises sandstone, and the glass has a thermal expansion coefficient in a range of $85\times10^{-7}$ $K^{-1}$ to $135\times10^{-7}K^{-1}$;
wherein the stone comprises basalt, and the glass has a thermal expansion coefficient in a range of $30\times10^{-7}$ $K^{-1}$ to $75\times10^{-7}K^{-1}$;
wherein the stone comprises petrified wood, and the glass has a thermal expansion coefficient in a range of $85\times10^{-7}$ $K^{-1}$ to $135\times10^{-7}K^{-1}$;
wherein the stone comprises a trilobite, and the glass has a thermal expansion coefficient in a range of $85\times10^{-7}$ $K^{-1}$ to $135\times10^{-7}K^{-1}$; or
wherein the stone comprises quartzite, and the glass has a thermal expansion coefficient in a range of $90\times10^{-7}$ $K^{-1}$ to $140\times10^{-7}K^{-1}$.

14. The method of claim 13, wherein the quartzite comprises aventurine.

15. A method of forming a macrocomposite, the method comprising:
dispersing or immersing a glass in a stone, wherein the glass has a volume of greater than 0.1 mm³;
wherein the macrocomposite does not comprise an organic resin, an adhesive, or a polymer;
wherein the method further comprises annealing the glass after the glass is dispersed or immersed in the stone;
wherein the stone comprises an igneous rock, a sedimentary rock, a metamorphic rock, petrified wood, a fossil, or a meteorite, or a combination thereof; and
wherein the glass comprises a phosphate glass.

16. The method of claim 13, wherein the glass comprises a phosphate glass.

17. The method of claim 15, wherein the difference in the coefficients of thermal expansion between the stone and the glass is less than $35\times10^{-7}$ $K^{-1}$.

18. The method of claim 15, wherein the stone comprises a void or concave area that may be filled with glass, and wherein dispersing or immersing a glass in a stone comprises filling the voids or concave areas with glass.

19. A composition comprising a stone and a glass,
wherein the glass comprises a phosphate glass;
wherein the stone is dispersed or immersed in the glass; and
wherein the stone has a volume of greater than 100 mm³.

20. The composition of claim 19, wherein the stone comprises an igneous rock, a sedimentary rock, a metamorphic rock, petrified wood, a fossil, or a meteorite, or a combination thereof.

21. The composition of claim 19,
wherein the glass has a combined mass percent of ZnO and $P_2O_5$ of at least 60;
wherein the glass comprises $Na_2O$, $K_2O$, $Li_2O$, CaO, MgO, or BaO, or a combination thereof, and $Al_2O_3$, $TiO_2$, $CeO_2$, $ZrO_2$, $Bi_2O_3$, or $SnO_2$, or a combination thereof, wherein the molar ratio of $\Sigma(ZnO, CaO, MgO, BaO, Na_2O, K_2O, Li_2O):\Sigma(P_2O_5, Al_2O_3, TiO_2, ZrO_2, CeO_2, Bi_2O_3, SnO_2)$ is 2:1;
wherein the glass comprises ZnO, $P_2O_5$, $Na_2O$, $K_2O$, $Li_2O$, $Al_2O_3$, $Bi_2O_3$, $CeO_2$, $TiO_2$, $SnO_2$, CaO, MgO, and BaO in the ranges provided in Table 1 of the instant specification;
wherein the glass comprises ZnO, $P_2O_5$, $Na_2O$, $K_2O$, $Li_2O$, $Al_2O_3$, $Bi_2O_3$, $CeO_2$, $TiO_2$, and $SnO_2$, in the ranges provided in Table 2 of the instant specification; or
wherein the glass comprises ZnO, $P_2O_5$, $Al_2O_3$, $TiO_2$, $Na_2O$, $K_2O$, CaO, and $Fe_2O_3$ in the ranges provided in Table 3 of the instant specification.

22. The composition of claim 19, wherein the stone comprises sandstone, petrified wood, quartzite, or a trilobite.

23. The composition of claim 19, wherein the glass comprises ZnO and $P_2O_5$.

24. A macrocomposite prepared by a method, the method comprising:

dispersing or immersing a stone in a glass, wherein the stone has a volume of greater than 100 $mm^3$;

annealing the glass after the stone is dispersed or immersed in the glass;

wherein the macrocomposite does not comprise an organic resin, an adhesive, or a polymer;

wherein the stone comprises an igneous rock, a sedimentary rock, a metamorphic rock, petrified wood, a fossil, or a meteorite, or a combination thereof; and wherein the glass comprises a phosphate glass.

* * * * *